(12) United States Patent
Cannankurichi Vijaya Mohan et al.

(10) Patent No.: US 9,343,960 B2
(45) Date of Patent: May 17, 2016

(54) FEEDBACK/FEED FORWARD SWITCHED CAPACITOR VOLTAGE REGULATION

(71) Applicant: LSI Corporation, San Jose, CA (US)

(72) Inventors: Naveen Kumar Cannankurichi Vijaya Mohan, Bangalore (IN); Ankuj Keshwani, Madhya Pradesh (IN); Ricky F. Bitting, Fort Collins, CO (US); Saumen Mondal, Gaya (IN)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 66 days.

(21) Appl. No.: 14/226,627

(22) Filed: Mar. 26, 2014

(65) Prior Publication Data

US 2015/0022169 A1    Jan. 22, 2015

(30) Foreign Application Priority Data

Jul. 22, 2013    (IN) .......................... 3254/CHE/2013

(51) Int. Cl.
*H02M 3/335*    (2006.01)
*H02M 3/07*    (2006.01)

(52) U.S. Cl.
CPC ...................... *H02M 3/07* (2013.01)

(58) Field of Classification Search
CPC ... H02M 3/07; H02M 3/18; H02M 2003/072; H02M 3/1584; H02M 2001/0058; G06F 1/325; G06F 1/3215
USPC ............ 323/225, 274, 276, 282–288; 363/49, 363/21.01, 21.02, 21.03, 21.14, 59, 60, 65, 363/69, 127; 713/320, 300
See application file for complete search history.

(56) References Cited

U.S. PATENT DOCUMENTS

| | | | |
|---|---|---|---|
| 4,665,458 A | 5/1987 | Matsuoka | |
| 5,581,454 A | 12/1996 | Collins | |
| 5,864,702 A * | 1/1999 | Walsh | G06F 1/325 713/300 |
| 6,606,004 B2 * | 8/2003 | Staszewski et al. | 331/17 |
| 6,819,163 B1 | 11/2004 | Gregoire, Jr. | |
| 7,030,596 B1 * | 4/2006 | Salerno | H02M 3/158 323/282 |
| 7,038,438 B2 * | 5/2006 | Dwarakanath | H02M 3/157 323/283 |
| 7,095,220 B2 * | 8/2006 | Kernahan | 323/300 |
| 7,218,533 B2 * | 5/2007 | Radecker | H02M 3/28 363/21.02 |
| 7,812,579 B2 * | 10/2010 | Williams | 323/266 |

(Continued)

OTHER PUBLICATIONS

H.-P. Le et al., "Design Techniques for Fully Integrated Switched-Capacitor DC-DC Converters," IEEE JSSC, vol. 46, No. 9, pp. 2120-2131, Jul. 12, 2011.

(Continued)

*Primary Examiner* — Rajnikant Patel

(57) ABSTRACT

A method of controlling a switched capacitor voltage regulator includes modifying a topology factor associated with the switched capacitor voltage regulator in response to a change in output voltage associated with the switched capacitor voltage regulator, thereby maintaining an average output voltage associated with the switched capacitor voltage regulator. The method also includes modifying a loop delay associated with the switched capacitor voltage regulator in response to a change in operational frequency associated with the switched capacitor voltage regulator, thereby reducing ripple amplitude associated with the switched capacitor voltage regulator. A corresponding feedback/feed forward switched capacitor voltage regulator, controller, computer-readable medium, and voltage regulation system are also disclosed.

20 Claims, 24 Drawing Sheets

(56) References Cited

U.S. PATENT DOCUMENTS

| | | | |
|---|---|---|---|
| 7,907,429 B2 * | 3/2011 | Ramadass et al. | 363/59 |
| 8,432,712 B2 | 4/2013 | Borisov | |
| 9,106,201 B1 * | 8/2015 | Chakraborty et al. | |
| 2010/0072961 A1 | 3/2010 | Kosonocky et al. | |
| 2010/0201337 A1 * | 8/2010 | Bradbury | G05F 1/46 323/288 |
| 2011/0154068 A1 | 6/2011 | Huang et al. | |
| 2011/0304306 A1 | 12/2011 | Galal et al. | |

OTHER PUBLICATIONS

T.M. Van Breussegem et al., "Monolithic Capacitive DC-DC Converter With Single Boundary—Multiphase Control and Voltage Domain Stacking in 90 nm CMOS," IEEE JSSC, vol. 46, No. 7, pp. 1715-1727, May 19, 2011.

* cited by examiner

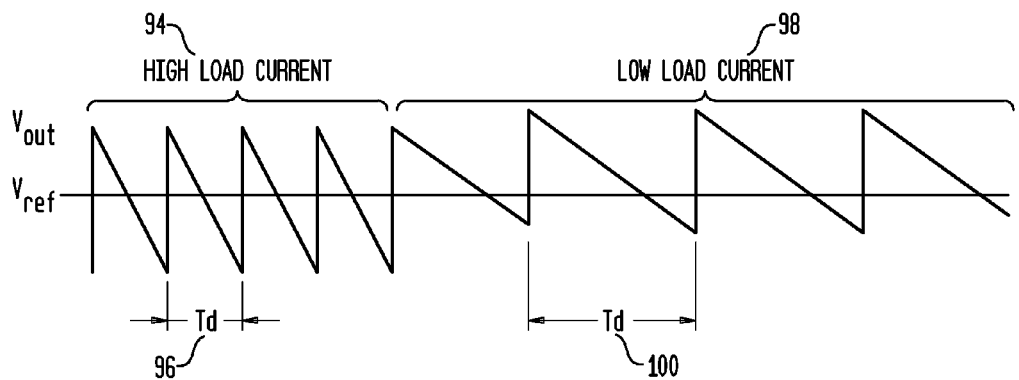

FIG. 8

| MODE | FREQUENCY RANGE (MHz) | BINARY IDENTIFICATION WORD | DELAY |
|---|---|---|---|
| 1 | 0-20 | 111 | 8*td |
| 2 | 20-35 | 110 | 7*td |
| 3 | 35-55 | 101 | 6*td |
| 4 | 55-70 | 100 | 5*td |
| 5 | 70-90 | 011 | 4*td |
| 6 | 90-105 | 010 | 3*td |
| 7 | 105-125 | 001 | 2*td |
| 8 | 125-140 | 001 | 1*td |
| 9 | >140 | 000 | 0*td |

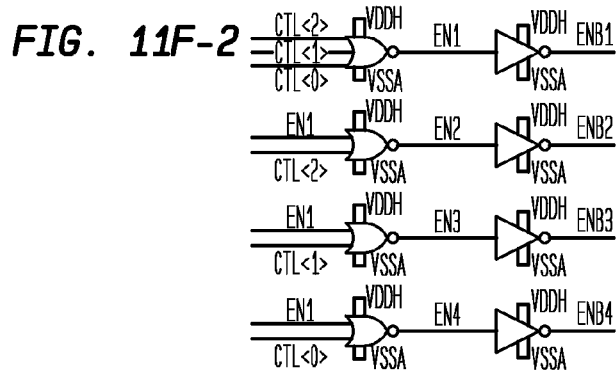
FIG. 11F-2
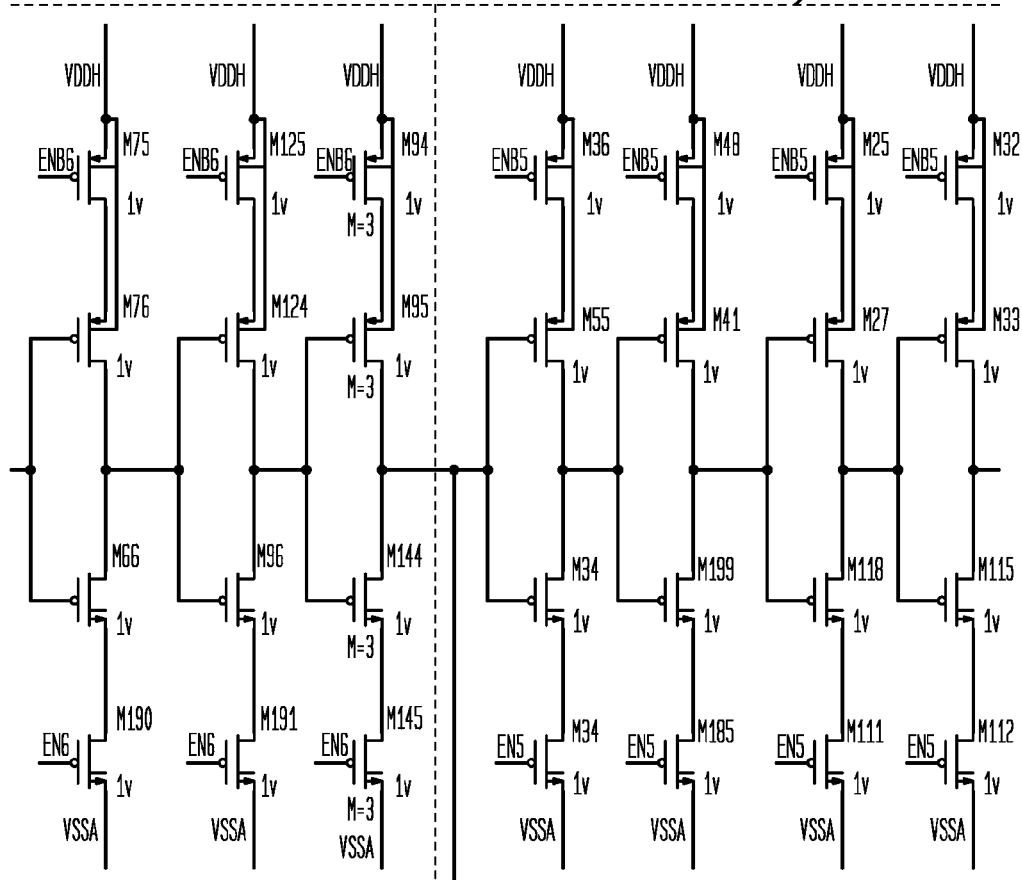
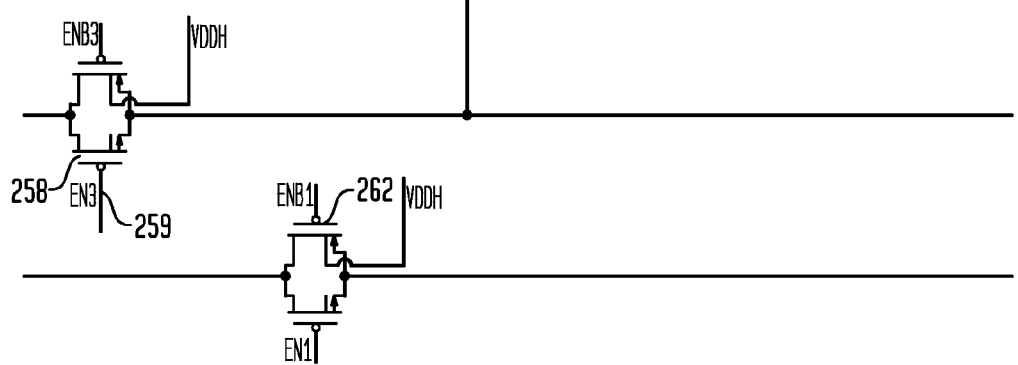

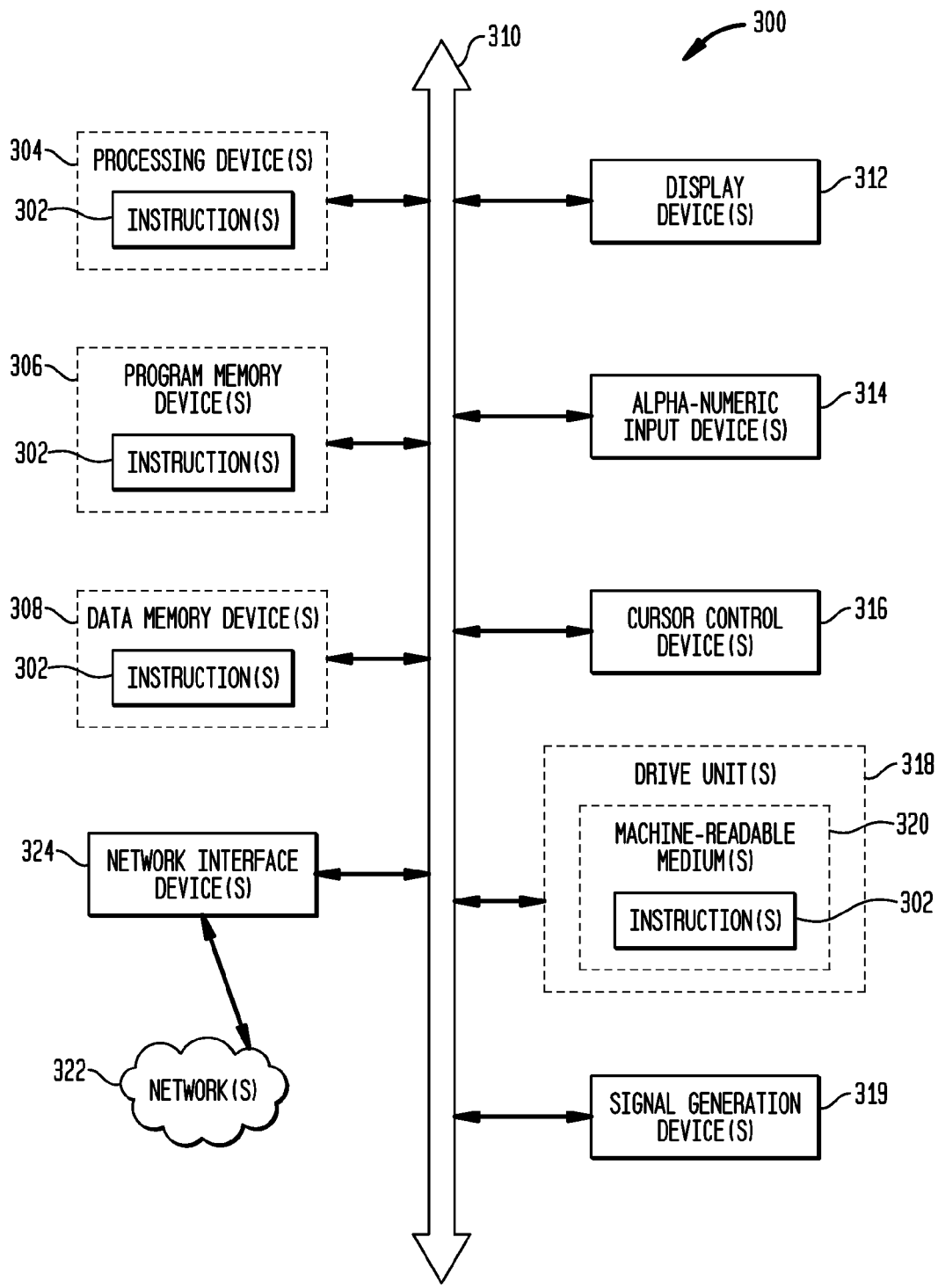

ND SWITCHED
FEEDBACK/FEED FORWARD SWITCHED CAPACITOR VOLTAGE REGULATION

CROSS-REFERENCE TO RELATED APPLICATIONS

This application claims priority under 35 U.S.C. §119 from Indian Patent Application No. 3254/CHE/2013 filed in the Indian Patent Office on Jul. 22, 2013, the disclosure of which is incorporated herein by reference in its entirety.

FIELD OF INVENTION

The present invention relates generally to electrical and electronic circuitry, and more particularly relates to switched capacitor voltage regulation.

BACKGROUND

Voltage regulators control or adjust an incoming source of electrical potential to meet specific requirements of an electronic device. Voltage regulators increase or decrease the voltage provided by the source, and provide a substantially constant voltage to the device despite variations in current dissipated by the device or variations in the value of the incoming source voltage. A portion of the power supplied to an input of a voltage regulator is dissipated by the regulator, and thus not provided at the output of the voltage regulator. The amount of power provided by voltage regulators, expressed as a percentage fraction of the power received, is referred to as the voltage conversion efficiency of the voltage regulator.

Switched capacitor voltage regulator designs utilize flying capacitor techniques. In this scheme, a capacitor is electronically switched between input and output ports to transfer charge that the capacitor received from the input port to the output port. Output voltage regulation is accomplished by controlling the switching rate of the flying capacitor and the ratio between the value of the flying capacitor and output capacitance. In commercially available designs, a single capacitive element is used to implement the flying capacitor function. Since only a single capacitive element is used, no power conversion is possible with this scheme since there is no change in the value of the flying capacitor, and thus the input port current remains equal to or greater than the output port current. Hence, the efficiency of switched capacitor voltage regulators is approximately equal to that of linear series voltage regulators. One advantage of switched capacitor voltage regulators is voltage inversion capabilities, which provide a negative output voltage from a positive voltage source.

SUMMARY

In accordance with an embodiment of the invention, a method of controlling a switched capacitor voltage regulator includes modifying a topology factor associated with the switched capacitor voltage regulator in response to a change in output voltage associated with the switched capacitor voltage regulator, thereby maintaining an average output voltage associated with the switched capacitor voltage regulator. The method also includes modifying a loop delay associated with the switched capacitor voltage regulator in response to a change in operational frequency associated with the switched capacitor voltage regulator, thereby reducing ripple amplitude associated with the switched capacitor voltage regulator.

In accordance with another embodiment of the invention, a feedback/feed forward switched capacitor voltage regulator includes a switched capacitor voltage regulator, a topology factor circuit, and a loop delay circuit. The topology factor circuit is operatively coupled to the switched capacitor voltage regulator, and modifies a topology factor associated with the switched capacitor voltage regulator in response to a change in output voltage associated with the switched capacitor voltage regulator, thereby maintaining an average output voltage associated with the switched capacitor voltage regulator. The loop delay circuit is operatively coupled to the switched capacitor voltage regulator, and modifies a loop delay associated with the switched capacitor voltage regulator in response to a change in operational frequency associated with the switched capacitor voltage regulator, thereby reducing ripple amplitude associated with the switched capacitor voltage regulator.

In accordance with a further embodiment of the invention, a controller for a switched capacitor voltage regulator includes a topology factor circuit and a loop delay circuit. The topology factor circuit is configure to be coupled to a switched capacitor voltage regulator, and modifies a topology factor associated with the switched capacitor voltage regulator in response to a change in output voltage associated with the switched capacitor voltage regulator, thereby maintaining an average output voltage associated with the switched capacitor voltage regulator. The loop delay circuit is configured to be coupled to the switched capacitor voltage regulator, and modifies a loop delay associated with the switched capacitor voltage regulator in response to a change in operational frequency associated with the switched capacitor voltage regulator, thereby reducing ripple amplitude associated with the switched capacitor voltage regulator.

In accordance with another embodiment of the invention, a computer-readable medium is provided to store instructions that, when executed by a processing device, cause the processing device to perform operations which include modifying a topology factor associated with a switched capacitor voltage regulator in response to a change in output voltage associated with the switched capacitor voltage regulator, thereby maintaining an average output voltage associated with the switched capacitor voltage regulator. The operations also include modifying a loop delay associated with the switched capacitor voltage regulator in response to a change in operational frequency associated with the switched capacitor voltage regulator, thereby reducing ripple amplitude associated with the switched capacitor voltage regulator.

In accordance with another embodiment of the invention, a voltage regulation system includes a processing device and a storage device for storing instructions that, when executed by the processing device, cause the processing device to perform operations which include modifying a topology factor associated with a switched capacitor voltage regulator in response to a change in output voltage associated with the switched capacitor voltage regulator, thereby maintaining an average output voltage associated with the switched capacitor voltage regulator. The operations also include modifying a loop delay associated with the switched capacitor voltage regulator in response to a change in operational frequency associated with the switched capacitor voltage regulator, thereby reducing ripple amplitude associated with the switched capacitor voltage regulator.

Embodiments of the invention will become apparent from the following detailed description, which is to be read in connection with the accompanying drawings.

BRIEF DESCRIPTION OF THE DRAWINGS

The following drawings are presented by way of example only and without limitation, wherein like reference numerals indicate corresponding elements throughout the several views, and wherein:

FIG. 5A is an output waveform of one or more embodiments of the SCVR disclosed herein;

FIG. 5B is a table listing parameters associated with the output waveform shown in FIG. 5A;

FIG. 8 is a table showing operating frequencies and delays corresponding to modes of one or more embodiments of the feedback/feed forward SCVR disclosed herein;

FIG. 13 is a block diagram showing at least a portion of an exemplary machine in the form of a computing system configured to perform methods according to one or more embodiments disclosed herein.

Figure 1A:
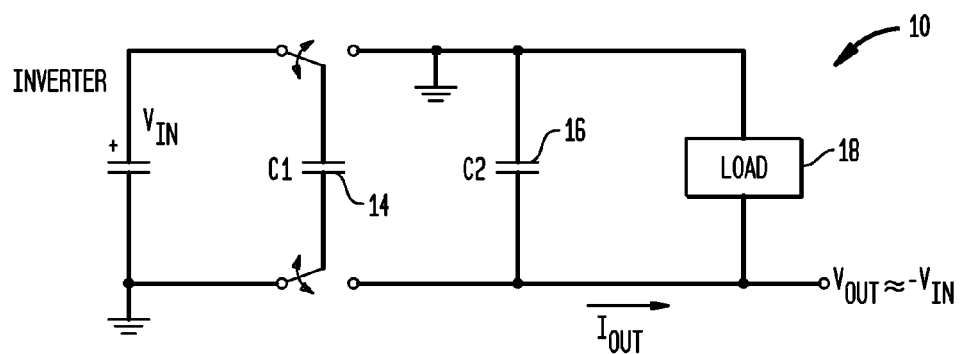
FIG. 1A is a schematic diagram of a first embodiment of a switched capacitor voltage regulator (SCVR)

It is to be appreciated that elements in the figures are illustrated for simplicity and clarity. Common but well-understood elements, which may be useful or necessary in a commercially feasible embodiment, are not necessarily shown in order to facilitate a less hindered view of the illustrated embodiments.

DETAILED DESCRIPTION

Embodiments of the invention will be described herein in the context of illustrative switched-capacitor voltage regulator (SCVR) circuits. The embodiments described herein advantageously utilize topology factor control and loop delay control in a feedback/feed forward technique. Consequently, SCVRs implemented using feedback/feed forward techniques in accordance with embodiments of the invention described herein beneficially provide enhanced performance, reduced power consumption, reduced ripple amplitude, and improved regulation of average output voltage when compared with conventional SCVRs. Moreover, aspects of these embodiments essentially eliminate DC bias and collapse of SCVRs otherwise incurred by conventional approaches when load current requirements increase beyond that which conventional SCVRs are able to supply. It should be understood, however, that embodiments of the invention are not limited to these or any other particular voltage regulation circuits. Moreover, it will become apparent to those skilled in the art given the teachings herein that numerous modifications can be made to the embodiments shown that are within the scope of the claimed invention. That is, no limitations with respect to the embodiments shown and described herein are intended or should be inferred.

SCVRs, which include hysteretic controls, have fundamental limitations associated with a maximum frequency of operation and delay paths. These limitations define average output voltage, ripple, and efficiency, among other characteristics, for a particular set of conditions, such as, for example, topology factor, input voltage and load current. Embodiments of the invention described herein are directed broadly to efficiently controlling the ripple, average output voltage, and/or topology factor in an SCVR.

Voltage regulators are designed to maintain a constant voltage level in response to varying input voltages. SCVRs accomplish energy transfer and voltage conversion using one or more capacitors. The two most common SCVR configurations are the voltage inverter 10 shown in FIG. 1A and the voltage doubler 12 shown in FIG. 1B. In the voltage inverter 10, a charge pump capacitor C1 14 is charged to an input voltage during a first half of a switching cycle. During a second half of the switching cycle, the input voltage of capacitor C1 14 is inverted and applied to a capacitor C2 16 and a load 18. The output voltage is a negative value of the input voltage, and the average input current is approximately equal to the output current. The switching frequency determines the value of the external capacitors. Higher switching frequencies enable output capacitors with lower values to be used. A duty cycle of the SCVR is defined as the ratio of charging time for capacitor C1 14 to the entire switching cycle time.

Following initial start-up transient conditions and upon reaching a steady-state condition, the charge pump capacitor C1 14, also referred to herein as a "flying capacitor," supplies a small amount of charge to the output capacitor during each switching cycle. The amount of charge transferred depends at least in part on load current and switching frequency. During the time the flying capacitor C1 14 is charged by the input voltage, the output capacitor C2 16 supplies the load current. The load current flowing out of capacitor C2 16 causes a droop in the output voltage that corresponds to a component of output voltage ripple. Higher switching frequencies allow smaller capacitors for the same amount of droop. There are, however, practical limitations on the switching speeds and switching losses, and switching frequencies are generally limited to about a few hundred kilohertz (KHz).

Figure 1B:
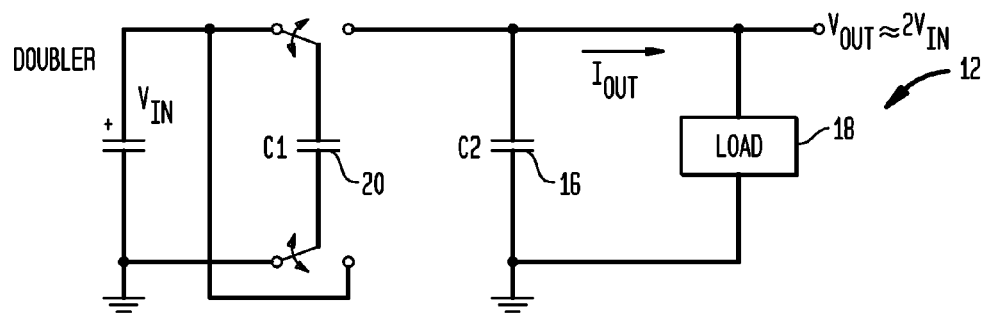
FIG. 1B is a schematic diagram of a second embodiment of the SCVR.

The voltage doubler 12 shown in FIG. 1B operates in a similar manner to the inverter 10 shown in FIG. 1A. However, a pump capacitor C1 20 is coupled in series with the input voltage during a discharge cycle associated with the pump capacitor C1 20, thereby accomplishing a voltage doubling function. In the voltage doubler 12, the average input current is approximately twice the average output current.

The voltage inverter 10 is useful where a relatively low-current negative voltage is required in addition to a primary positive voltage. This may occur in a single supply system, in which only a few high performance parts require the negative voltage. Similarly, the voltage doubler 12 is useful in low current applications, in which a voltage greater than the primary supply voltage is required.

Hysteresis represents a lag in a variable property of a system with respect to the effect producing it as the producing effect varies. Thus, with respect to SCVRs, hysteretic control refers to delaying changes in an output voltage of the SCVR due to changes in an input voltage of the SCVR in order to avoid undesirable rapid switching of the output voltage.

Technologies for which the embodiments disclosed herein are applicable include low-level circuits, such as serializer/deserializer circuits (SERDES), clock and data recovery (CDR) circuits, phase-locked loop (PLL) circuits, timing circuits, amplifiers, electrostatic discharge (ESD) circuits, input/output buffers, and the like.

A SERDES represents a pair of functional blocks used in high-speed communications to compensate for limited input ports and output ports. These blocks convert data between serial and parallel interfaces bidirectionally.

High-speed serial data streams, such as a raw stream of data from a magnetic head of a disk drive, are often transmitted without an accompanying clock signal. The receiver generates a clock from an approximate frequency reference, and then phase-aligns to the transitions in the data stream with a PLL. This process is commonly known as CDR and is related to the problem of carrier recovery, which is the process of re-creating a phase-locked version of a carrier when a suppressed carrier modulation scheme is used. In order for CDR to work, a data stream must transition frequently enough to correct for any drift in an oscillator of the PLL.

A PLL is an electronic circuit with a voltage- or current-driven oscillator that is adjusted to match in-phase (and thus lock on) the frequency of an input signal. In addition to stabilizing a particular communications channel, which includes maintaining the channel at a particular frequency, a PLL can be used to generate a signal, modulate or demodulate a signal, reconstitute a signal with less noise, or multiply or divide a frequency. PLLs are frequently used in wireless communication, particularly where signals are carried using frequency modulation (FM) or phase modulation (PM). PLLs can also be used in amplitude modulation (AM). PLLs are more commonly used for digital data transmission, but can also be designed for use with analog information. Phase-locked loop devices are more commonly manufactured as integrated circuits (ICs). Since a PLL requires a certain amount of time to lock on to the frequency of an incoming signal, intelligence on the signal (voice, video, or data) can be obtained directly from the waveform of the measured error voltage, which will reflect the modulated information on the signal.

SCVRs are similar to inductor-based switching voltage regulators (SVR) and low drop-out (LDO) voltage regulators in that SCVRs use voltage from a battery and convert that voltage to output voltages required by, for example, a system-on-a-chip (SoC). SCVRs can be used as a power supply for any block in the SoC. SERDES transceiver applications require high power supply bandwidth, for which SCVRs are also a suitable candidate.

The rapid growth of the integrated circuit industry has been primarily fostered by the rising number of transistors on a chip and the speed of logic circuits. However, the emergence of power as the main design constraint has prevented further increases in logic speeds. In order to meet the increasing demand for processing performance, designers have utilized parallelism to increase throughput within strict power constraints.

As parallelism increases the number of cores integrated onto a chip, there is an increasing need and potential benefit to utilizing an independent power supply for each core in order to optimize total chip power and circuit performance. Simply adding off-chip supplies not only incurs significant degradation of supply impedance due to split package power planes and a limited number of pins, but also additional cost due to increased motherboard size and package complexity. Therefore, there are advantages to fully integrate voltage conversion on a silicon chip. Although on-die DC-DC converters are implemented using linear regulators, achieving high efficiency across a broad range of output voltages makes the use of switching converters highly advantageous. Fully integrated DC-DC converters based on complementary metal-oxide-semiconductor (CMOS) inductors either require costly additional fabrication steps, such as thick metals or integrated magnetic materials to improve inductor quality factor (Q), or suffer from higher series resistance and lower energy density, and thus lower efficiency. Integrated capacitors can achieve lower series resistance and higher capacitance density, and can be used to implement DC-DC converters in current CMOS processes without additional fabrication steps.

The increasing power consumption of high-performance circuits, such as microprocessors and power-hungry radio front-ends, demonstrates a need for integrated power management. The supply voltage of these circuits is decreasing at a steady pace and is quickly trending towards 1V and less. Moreover, voltage scaling and the use of multiple voltage domains has grown into a widespread technique for reducing overall power consumption. Since distinct subsystems on an SoC have different optimum supply voltages, the power consumption can be reduced drastically by introducing multiple supply rails.

Figure 2A:
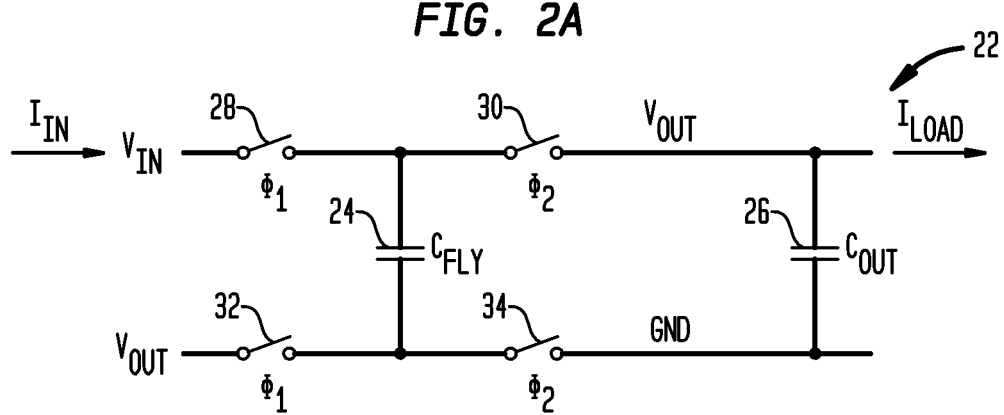
FIGS. 2A-C are schematic diagrams of a third embodiment of the SCVR.
Figure 2B:
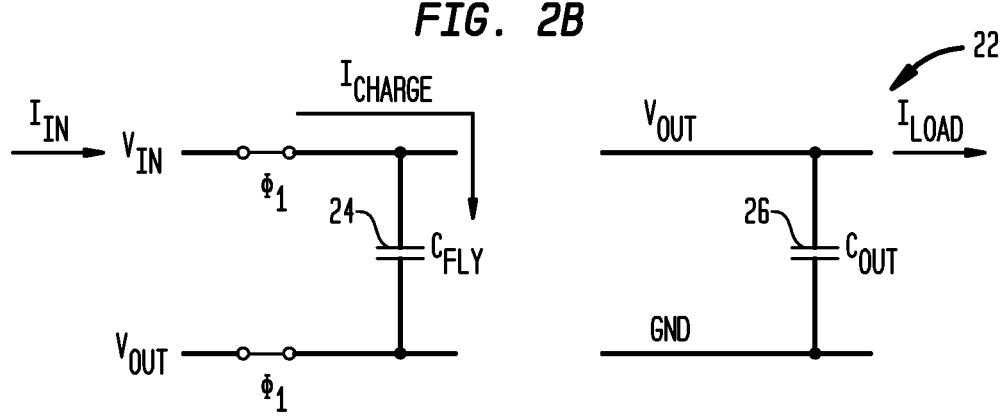
Figure 2C:
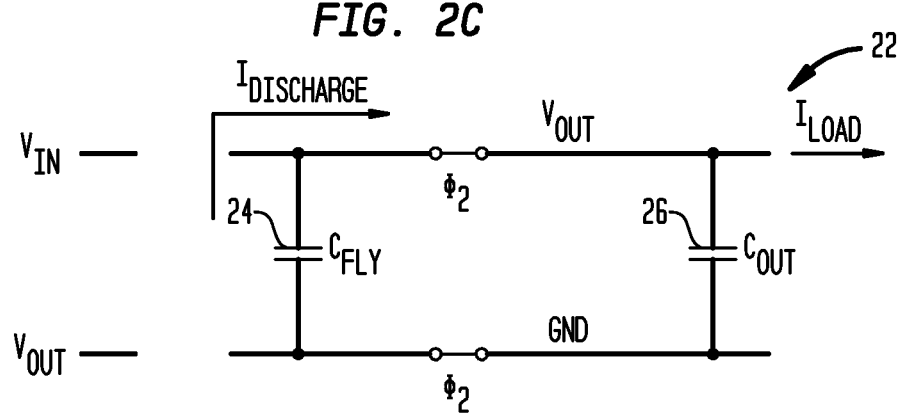

Capacitive DC-DC converters are variable structure systems that transfer charge from an input terminal to an output terminal using capacitors. A single flying capacitor voltage-divider 22 is shown in FIG. 2A, which is a capacitive 1/2 step-down DC-DC converter. The converter 22 provides a voltage conversion ratio near 1/2, which is imposed by the topology of the DC-DC converter. This topology includes a charge-transferring capacitor 24 (the flying capacitor), a buffer capacitor 26, and four switches 28-34. The DC-DC converter 22 operates in a two-phase cycle. In a first phase, shown in FIG. 2B, the flying capacitor 24 is connected between the converter's input node and its output node. During the second phase, the flying capacitor 24 is connected between the output node and a ground node shown in FIG. 2C. By switching between these configurations, charge is transferred from the input to the output of the DC-DC converter 22.

Figure 6:
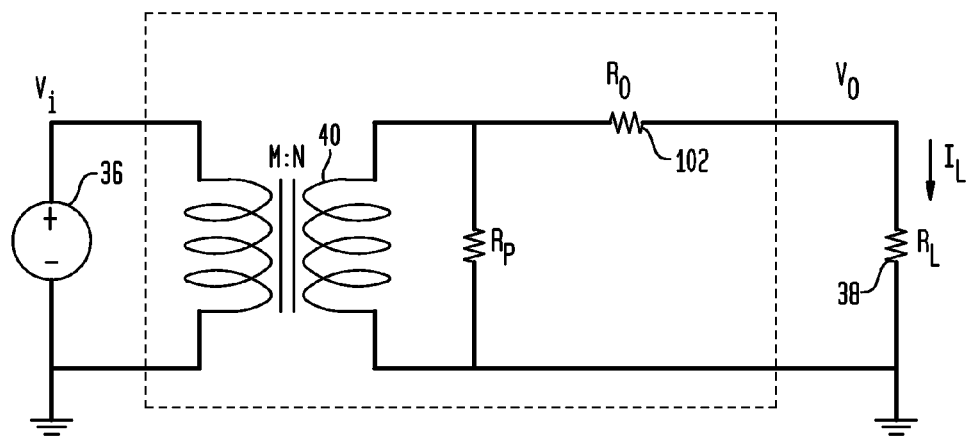
FIG. 6 is a schematic diagram of an equivalent circuit of a switch cell for use with one or more embodiments of a feedback/feed forward SCVR disclosed herein.

The capacitive converter 22 is modeled by an ideal voltage source 36 with a non-zero output impedance 38 shown in FIG. 6. The capacitive converter 22 has a fixed ideal voltage conversion ratio (iVCR). The capacitive converter 22 can attain this iVCR by imposing a zero output impedance or when no current is delivered to the load. In a more practical case, the output impedance 38 is non-zero, but kept as small as possible to provide the features shown in FIGS. 2A-C.

The illustrative circuit shown in FIG. 6 includes the voltage source 36, a DC transformer 40 with a voltage conversion ratio, and the output impedance 38. The output impedance 38 has a dual nature. At low switching frequencies, if the time constants of the capacitive converter 22 are less than the switching period, the output impedance 38 is inversely proportional to the switching frequency of the capacitive converter 22 and the flying capacitance. If the capacitive converter 22 is operating in a slow switching limit (SSL) and Ro 42 is approximately equal to $R_{SSL}$, then $R_{SSL}$ is provided by the following equation:

$$R_{SSL} = \frac{K_c}{C_{fly} f_{sw}} \quad (1)$$

At high switching frequencies, the capacitive converter 22 time constants exceed the switching period and the parasitic resistances in the circuit dominate the output impedance. This region is referred to as the fast switching limit (FSL), in which the output impedance is inversely proportional to the total switch conductance $G_{tot}$, a duty cycle D, and is Ro 42 is approximately equal to $R_{FSL}$, which is provided by the following equation:

$$R_{FSL} = \frac{K_s}{DG_{tot}} \quad (2)$$

If the duty cycle is equal to 50%, equation (2) reduces to the following equation:

$$R_{FSL} = \frac{2K_s}{G_{tot}} \quad (3)$$

The total output impedance is approximated by the square of the quadratic sum of the SSL and FSL impedances: (4)

$$R_{out} = \sqrt{R_{SSL}^2 + R_{FSL}^2} \quad (4)$$

The proportionality constants $K_c$ and $K_s$ depend on the topology. $K_c$ is defined as follows:

$$K_c = \Sigma_i a_{c,i}^2 \quad (5)$$

for which $a_{c,i}$ are elements of the charge multiplier vector $a_c$. There is only one flying capacitor $C_{fly}$, and $a_{Cfly}=1/2$. This yields $K_c=0.25$. Similarly, $K_s$ is defined as follows:

$$K_s = \Sigma_j a_{s,j}^2 \quad (6)$$

for which $a_{s,j}$ are elements of the switch vector $a_s$. There are four switches and $a_{s,j}=1/2$. This yields $K_S=1$.

Embodiments of a feedback/feed forward SCVR disclosed herein address the following issues: (1) if the load current that an SCVR supplies increases beyond the capability of the SCVR, then the SCVR introduces a DC shift in the output voltage, which can ultimately damage the SCVR; and (2) for the output voltage of the SCVR to exhibit a minimum of ripple amplitude, a delay in the critical path through the SCVR should be adjusted. Due to these issues, the feedback/feed forward SCVR in accordance with embodiments disclosed herein limits the maximum load current that the SCVR can supply. In addition, using feedback/feed forward control, the maximum load current that the feedback/feed forward SCVR can supply is increased without degrading performance.

Figure 3:
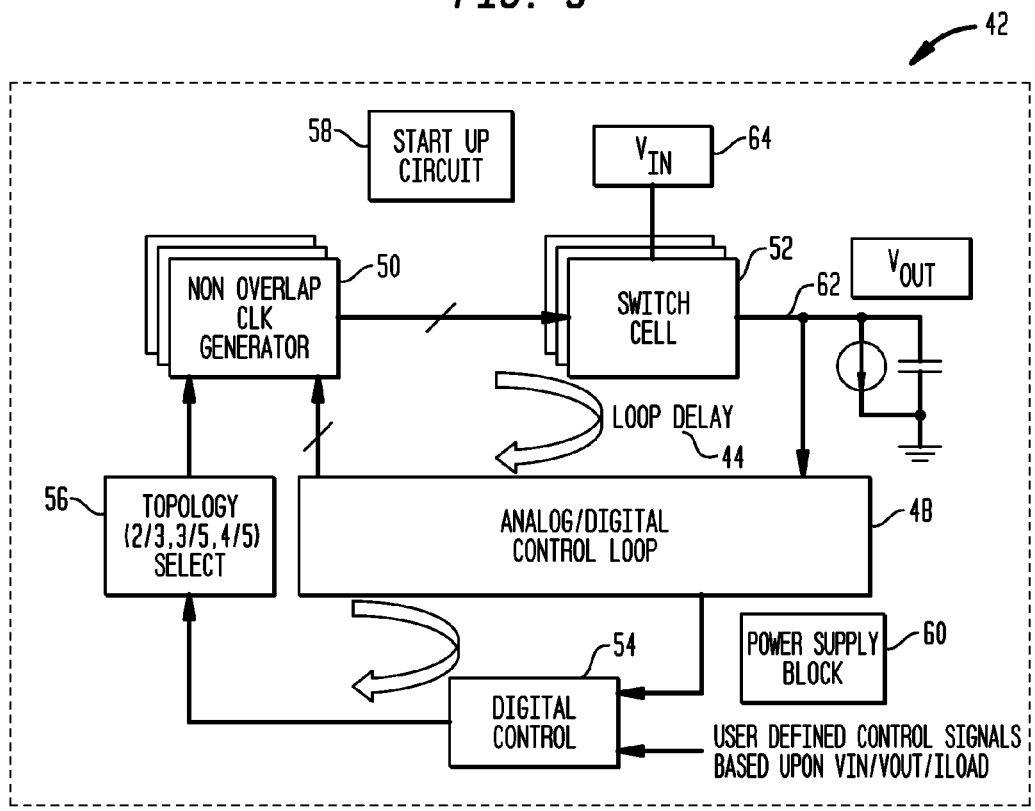
FIG. 3 is a high-level block diagram of a first embodiment of a feedback/feed forward SCVR showing a hysteretic loop delay.

The feedback/feed forward SCVR architecture referred to herein includes a hysteretic loop architecture. The maximum frequency and ripple amplitude of the feedback/feed forward SCVR is defined by a loop delay, which is also the critical path delay. As the loop delay increases, the maximum achievable frequency decreases. Maximum achievable frequency is proportional to the maximum load current that can be provided by the feedback/feed forward SCVR. A block diagram of a first embodiment 42 of the feedback/feed forward SCVR showing a loop delay 44 is shown in FIG. 3. The first embodiment 42 includes an analog/digital control loop circuit 48, a non-overlap clock generator 50, one or more interleaved capacitive switch cells 52 that include capacitive structures, a digital control circuit 54, a topology selection circuit 56, a startup circuit 58, and a power supply circuit 60. The loop delay 44 represents a period of time that a signal takes to propagate through the analog/digital control circuit 48, non-overlap clock generator 50, and capacitive switch cells 52. The capacitive switch cells 52 provide an output voltage 62 based on an input voltage 64. The digital control circuit 54 controls the topology selection circuit 56 based on user defined control signals that are derived from the input voltage 64, output voltage 62, and load. The non-overlap clock generator 50 controls switching of the switch cells 52 based on the topology selection circuit 56 and analog/digital control circuit 48.

Figure 4A:
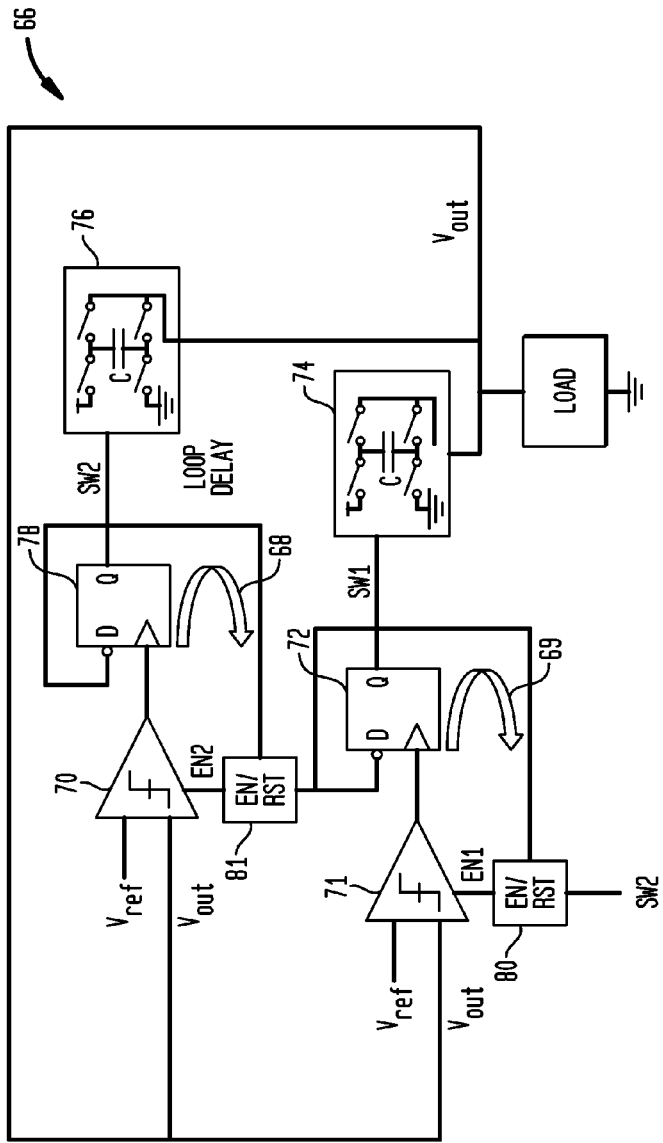
FIG. 4A is a high-level block diagram of a second embodiment of the feedback/feed forward SCVR showing the hysteretic loop delay.

A more detailed block diagram of a second embodiment 66 of the feedback/feed forward SCVR showing a hysteretic loop delay 68 is shown in FIG. 4A. A first loop delay 69 in the second embodiment 66 includes delays through a comparator 71, first flip-flop 72, and first enable/reset circuit 80. A second loop delay 68 in the second embodiment 66 includes delays through a comparator 70, second flip-flop 78, and second enable/reset circuit 81. The first loop delay 69 corresponds to the first switch cell 74, and the second loop delay 68 corresponds to the second switch cell 76. Interleaving the loop delays 68, 69, and thus the switch cells 74, 76, in the second embodiment 66 divide the ripple amplitude of the output voltage by the number of interleaved loop delays without degrading the maximum load current that can be provided. The maximum frequency of operation is dependent on the loop delay. As the frequency of operation is increased, the maximum load current that can be provided is increased using the same topology factor.

Figure 4B:
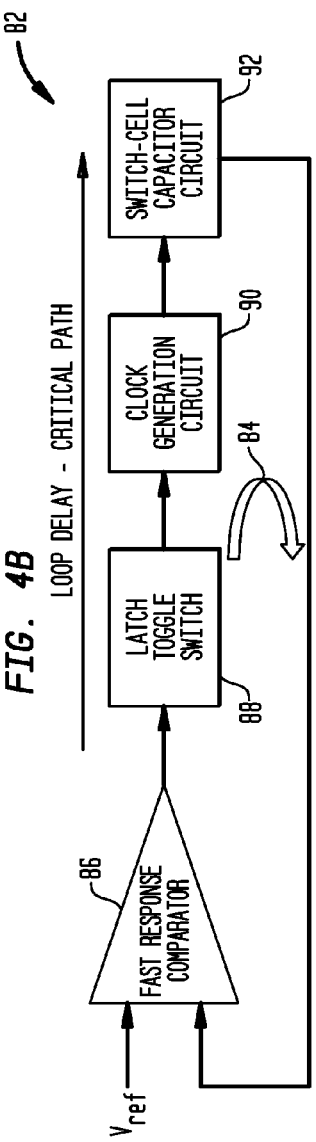
FIG. 4B is a high-level block diagram of a third embodiment of the feedback/feed forward SCVR showing the hysteretic loop delay.

A high-level block diagram of a third embodiment 82 of the feedback/feed forward SCVR showing a hysteretic loop delay 84 is shown in FIG. 4B. The loop delay 84 in the third embodiment 82 includes delays through a comparator 86, latch 88, clock generator circuit 90, and switch capacitor control circuit 92.

FIG. 5A is an output waveform of one or more embodiments of the SCVR disclosed herein, and FIG. 5B is a table listing parameters associated with the output waveform shown in FIG. 5A. Under high load current conditions 94, the ripple period $T_d$ 96 is low, the ripple frequency is high, and a DC shift may appear in the output voltage if the ripple period $T_d$ 96 is less than the loop delay. Under low load current conditions 98, the ripple period $T_d$ 100 is high, the ripple frequency is low, and no DC shift appears in the output voltage since the ripple period $T_d$ 100 is greater than the loop delay. The duration of the ripple period $T_d$ is limited by the loop delay. That is, the ripple period $T_d$ should be greater than the loop delay to avoid a dc shift in the output voltage. As the ripple period $T_d$ is increased, the maximum achievable load current is decreased The feedback/feed forward controlled SCVRs in accordance with one or more embodiments disclosed herein support a doubling of the maximum load current of conventional SCVRs without feedback/feed forward control or compromising performance. To solve the issues described above, a closed loop system is used that changes the topology factor of the SCVR in order to maintain a predetermined average output voltage. In addition, delays are introduced in the critical path based on the monitored frequency of operation to ensure that the ripple amplitude is reduced.

The feedback/feed forward controlled SCVR in accordance with embodiments disclosed herein is based on switching capacitor structures. The topology factor defines the ratio of ideal output voltage to input voltage. For a given capacitor structure, there can be many topology factors, such as 2/3, 4/5, 1/1, and the like. A particular topology factor is selected as appropriate based on input voltage and load conditions. Each topology factor associated with a given capacitor structure is also associated with a maximum frequency of operation. This maximum frequency of operation is defined by the loop delay of the critical path. The feedback/feed forward SCVR in accordance with embodiments herein adjusts the topology factor to maintain the output voltage and operation of the SCVR based on load current requirements.

The primary building blocks of SCVRs are capacitor structures, which are also referred to as switch cells. These capacitor structures are driven by clocks which are generated by the hysteretic loop architecture. Capacitors store and transfer energy to a load circuit. The capacitor structures typically include 1-3 capacitors connected in series and/or in parallel. Under no load conditions, the ratio of output voltage to input voltage Vout/Vin is defined as the topology factor, which, for down converters, is less than 1, such as 1/2, 2/3, 4/5, and the like. For example with a topology factor or mode of 1/2, if the input voltage Vin is 1.8 V, the output voltage Vout will be 0.9 V under no load conditions. Additional information concerning these concepts is disclosed in H. L. Lee, et al., *Design Techniques for Fully Integrated Switched-Capacitor DC-DC Converters*, JSSC, Jul. 12, 2011, the disclosure of which is incorporated by reference herein in its entirety.

Accordingly, if the feedback/feed forward SCVR is not able to support load current requirements in a particular topology factor or mode, the feedback/feed forward SCVR modifies the topology factor to a higher ratio. The decision to change the topology factor is based on the average output voltage, which is monitored by the feedback/feed forward SCVR. Thus, in response to a dc shift in the average output voltage due to higher load current requirements, the feedback/feed forward SCVR adjusts the topology factor, which enables the feedback/feed forward SCVR to continue operating at the higher load current requirements. For example, if the feedback/feed forward SCVR is configured in a 2/3 mode, in which the topology factor is 2/3, and a dc shift is detected in the average output voltage, the feedback/feed forward SCVR adjusts the mode of operation to a 4/5 mode, in which the topology factor is 4/5, and then to a 1/1 mode, in which the topology factor is 1/1, to ensure proper operation.

Changing the mode does not require a change in the input voltage. A schematic diagram of an ideal equivalent circuit of a switch cell for use with one or more embodiments of the feedback/feed forward SCVR disclosed herein is shown in FIG. 6 and a mapping of the mode, input voltage, and output voltage is provided in Table 1 below.

TABLE 1

| Mode | Input Voltage | Ideal Output Voltage | Actual Output Voltage |
|---|---|---|---|
| 1/2 | 1.8 volts | 0.9 volt | 0.8 volt |
| 2/3 | 1.8 volts | 1.2 volts | 0.8 volt |
| 3/5 | 1.8 volts | 1.08 volts | 0.8 volt |

In FIG. 6, m:n is 2:1 in the 1/2 mode. Resistance R0 102 represents intrinsic output impedance that depends on the mode of operation and the capacitor structure. If the difference between the ideal output voltage and the required output voltage is greater than the frequency requirement for switching will permit, the capacitance requirements will increase. In addition, as output resistance $R_L$ 38 increases, the frequency requirement increases to provide the same load current, thereby requiring a reduction in loop delay. Similarly, if the value of resistance R0 102 increases, the frequency requirement will also increase to provide the same load current, thereby requiring a reduction in loop delay. If the load current increases, the frequency requirement also increases, thereby requiring a reduction in loop delay. If the difference between the ideal output voltage and the required output voltage decreases, the frequency requirement also increases, thereby requiring a reduction in loop delay. In view of these characteristics, changing modes is beneficial to achieve a desired load current, a stable output voltage, and efficiency.

Higher output impedance will decrease ripple amplitude, and lower output impedance will increase ripple amplitude. Thus, if load current requirements are being met, the feedback/feed forward SCVR will select the mode that provides the lowest ripple amplitude. However, if load current requirements are not being met, the feedback/feed forward SCVR will select the mode that satisfies the load current requirements, albeit with an increase in ripple amplitude. Similarly, if output voltage requirements are being met, the feedback/feed forward SCVR will select the mode that provides the lowest ripple amplitude. However, if output voltage requirements are not being met, the feedback/feed forward SCVR is operative to select the mode that satisfies the output voltage requirements, even though this will result in an increase in ripple amplitude.

Figure 10:
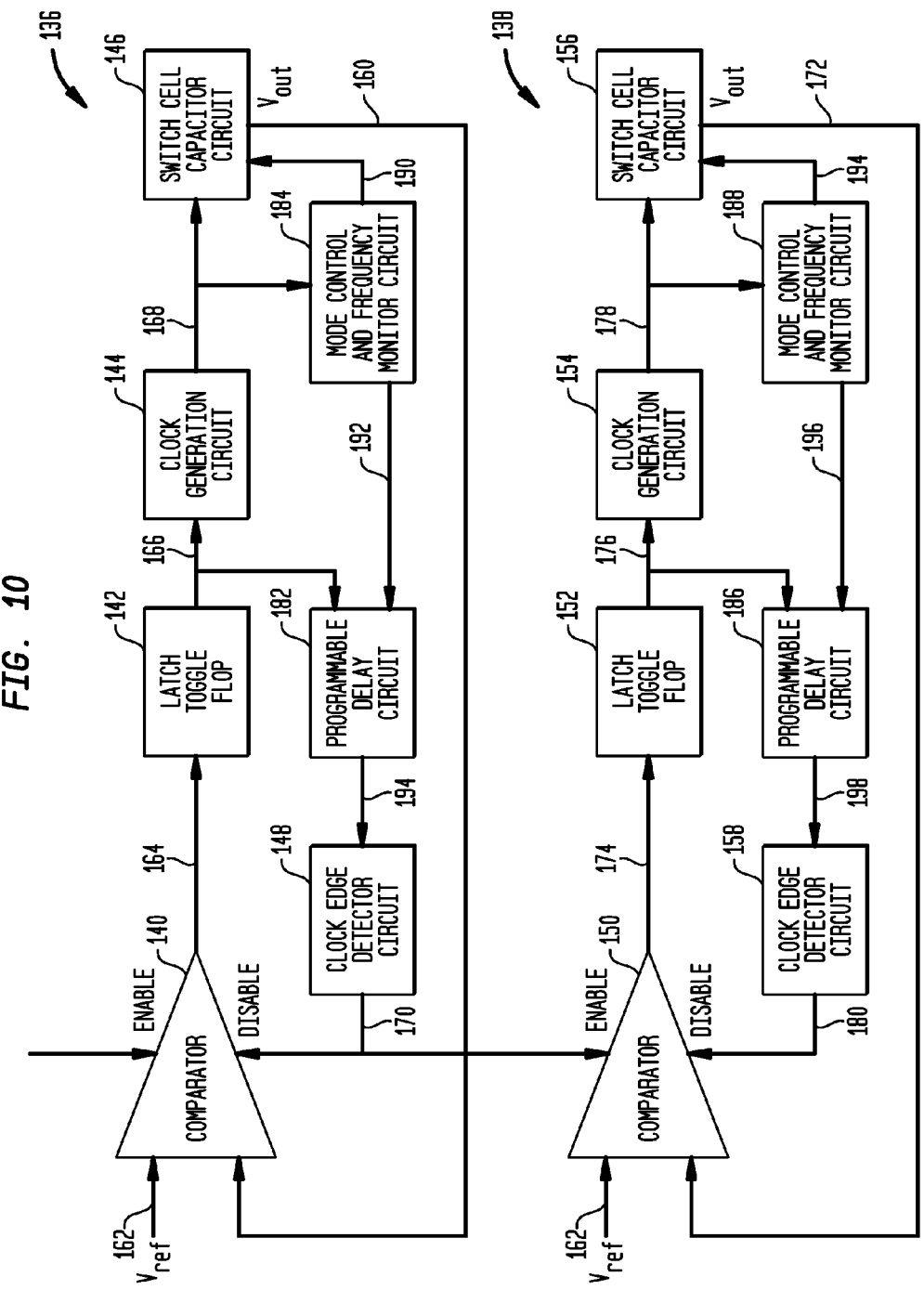
FIG. 10 is a block diagram of a fifth embodiment of the feedback/feed forward SCVR.

One of the fundamental limitations in maximizing the frequency of operation of the SCVR is the critical path delay. Decreasing the hysteretic loop delay increases the maximum operating frequency, and thus the maximum load current. The hysteretic loop delay generates the clock signal and there is a finite delay from relevant transitions in the clock signal to when the capacitive cell switches, which is referred to herein as the switch delay $T_{swd}$. If the hysteretic loop delay $T_{hysd}$ is greater than $T_{swd}$, then ripple associated with the output voltage is reduced. However, if the switch delay $T_{swd}$ is greater than the hysteretic loop delay $T_{hysd}$, then the amplitude of ripple is increased. For example, as shown in FIG. 10, the hysteretic loop delay generates the clock signal or output signal 168 by the comparator 140 detecting the first output voltage 160 as less than the reference voltage signal 162. This switches the comparison signal 164 from 0 to 1, which triggers the first latch toggle flop 142 to generate the clock or output signal 168 to the first switch cell capacitor circuit 146 that causes the first output voltage 160 to increase above the reference voltage signal 162.

If the hysteretic loop delay $T_{hysd}$ is maintained to be greater than the switch delay $T_{swd}$, then the maximum achievable frequency of the feedback/feed forward SCVR is limited to $1/(T_{hysd} \times 2 \times \text{quantity of interleaved switch cells/stages})$. By way of example only, if eight (8) interleaved stages are used in the feedback/feed forward SCVR and if $T_{hysd}$ is 400 picoseconds (ps), then a maximum achievable frequency is about 160 MHz. The hysteretic loop delay $T_{hysd}$ can be reduced to 200 ps, but the switch delay $T_{swd}$ is typically 300 ps. To overcome this issue, embodiments of the feedback/feed forward SCVR disclosed herein modulate the delay in the $T_{hysd}$ path to vary in accordance with the frequency of operation. For example, as load current requirements increase, the hysteretic loop delay $T_{hysd}$ is reduced to enable an increase in the frequency of operation. Likewise, as load current requirements decrease, the hysteretic loop delay $T_{hysd}$ is increased to enable a decrease in the frequency of operation. As a result, ripple amplitude is decreased. However, with higher load current requirements, the ripple amplitude may be increased, and thus a fixed delay is introduced into the $T_{hysd}$ loop to ensure that the feedback/feed forward SCVR does not enter a free running mode, which reduces the ripple amplitude while maintaining the average output voltage at or above a desired threshold. Although this technique reduces regulation of the output voltage, the average output voltage is still maintained above a desired threshold while minimizing ripple amplitude in response to varying load conditions.

Figure 7:
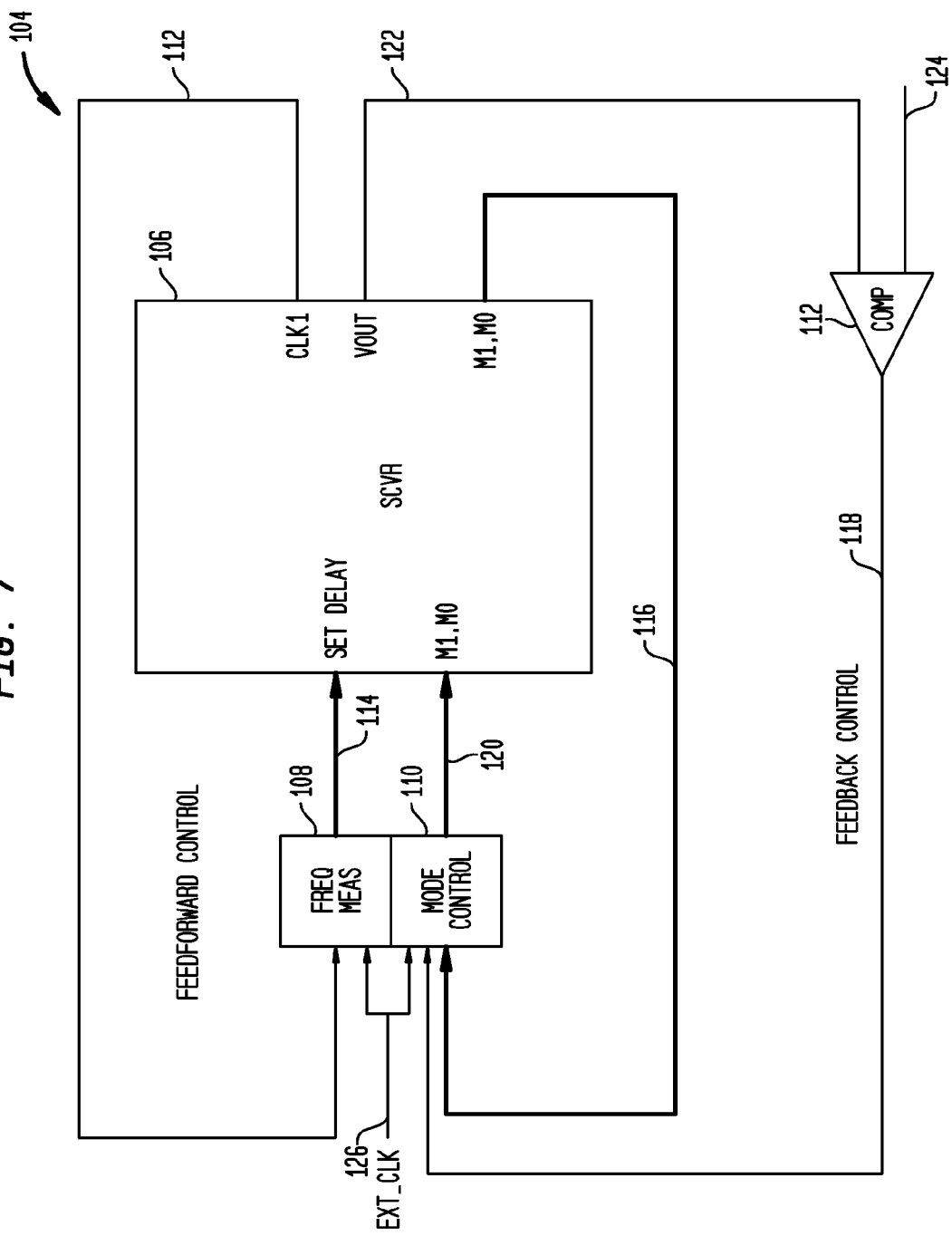
FIG. 7 is a block diagram of a fourth embodiment of the feedback/feed forward SCVR.

FIG. 7 shows a circuit diagram of one embodiment of the feedback/feed forward SCVR 104, which includes an SCVR 106, frequency measurement circuit 108, topology factor or mode control circuit 110, and voltage comparator 112. The frequency measurement circuit 108 monitors a clock signal 112 provided by the SCVR 106, and outputs one or more set delay signals 114 to the SCVR 102 to control the hysteretic loop delay. The mode control circuit 110 monitors one or more current mode signals 116 provided by the SCVR 106, and a voltage comparison signal 118 provided by the voltage comparator 112, and outputs one or more mode control signals 120 to the SCVR 106. The voltage comparator 112 compares a current output voltage signal 122 provided by the SCVR 106 with a reference voltage 124, and outputs the voltage comparison signal 118. An external clock signal 126 is provided to both the frequency measurement circuit 108 and the mode control circuit 110.

FIG. 8 shows a table that lists nine (9) modes or topology factors 128 associated with one or more of the embodiments of the feedback/feed forward SCVR disclosed herein. An operational frequency range 130 in megahertz, a binary identification word 132, and a delay 134 which is introduced in the hysteretic loop delay are provided for each of the corresponding modes 128. The delays 134 are expressed as multiples of a time delay $t_d$, such as 80 ps.

Figure 9:
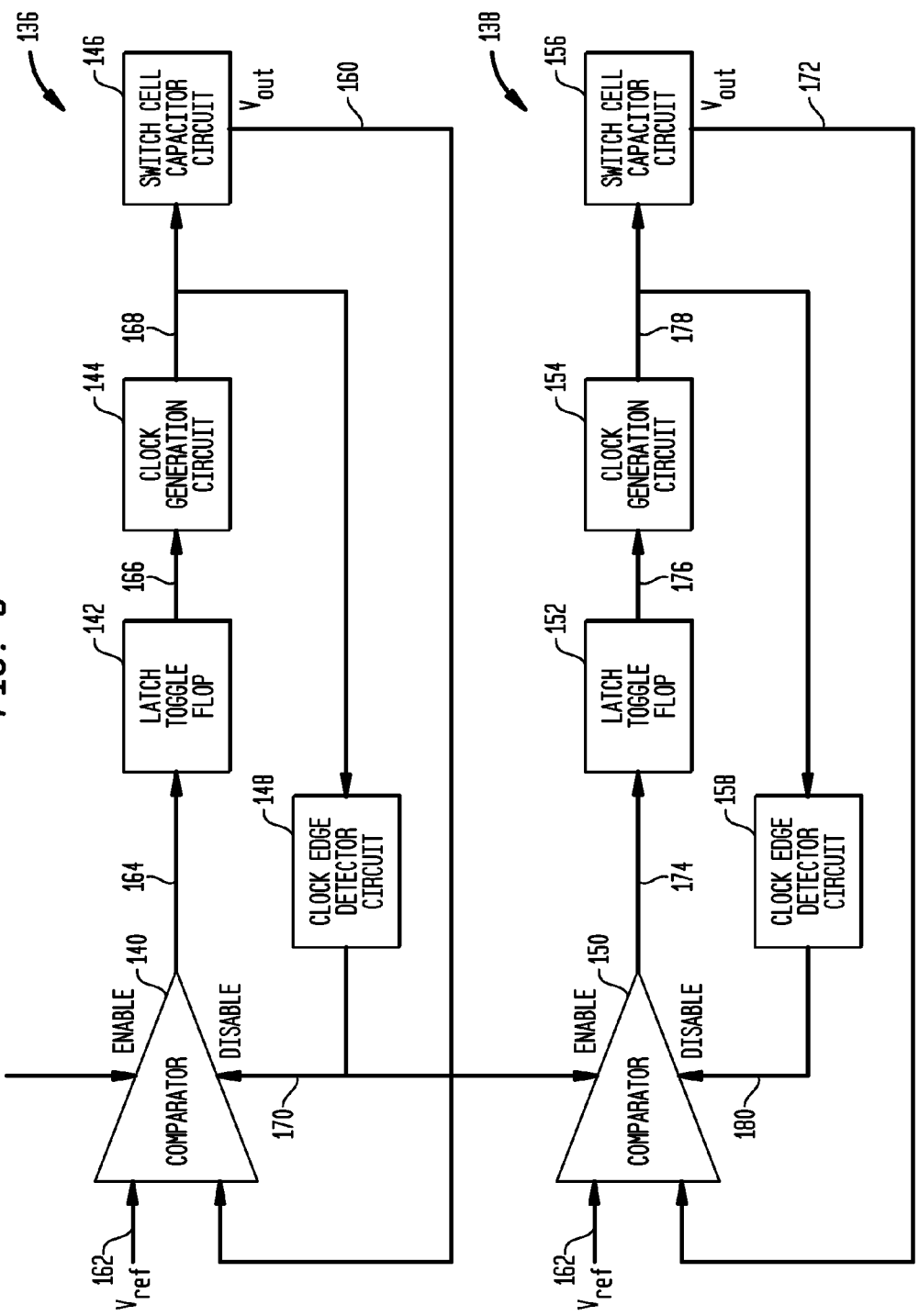
FIG. 9 is a block diagram of a fourth embodiment of the SCVR.

FIG. 9 is a block diagram of a fourth embodiment of the SCVR, which includes first and second interleaved circuits 136, 138. The first interleaved circuit 136 includes a first comparator 140, first latch toggle flip-flop 142, first clock generation circuit 144, first clock edge detector 148, and first switch cell capacitor circuit 146. The second interleaved circuit includes a second comparator 150, second latch toggle flip-flop 152, second clock generation circuit 154, second clock edge detector 158, and second switch cell capacitor circuit 156. In the first interleaved circuit 136, the first comparator 140 compares a first output voltage signal 160 with a reference voltage signal 162, and provides a comparison signal 164 to the first latch toggle flip-flop 142. An output signal 166 of the first latch toggle flip-flop 142 is provided to the first clock generation circuit 144, an output signal 168 of which is provided to the first switch cell capacitor circuit 146 and the first clock edge detector 148. An output signal 170 of the first clock edge detector 148 is used to disable the first comparator 140 and enable the second comparator 150. Similarly, the second comparator 150 compares a second output voltage signal 172 with the reference voltage signal 162, and provides a comparison signal 174 to the second latch toggle flip-flop 152. An output signal 176 of the second latch toggle flip-flop 142 is provided to the second clock generation circuit 154, an output signal 178 of which is provided to the second switch cell capacitor circuit 156 and the second clock edge detector 158. An output signal 180 of the second clock edge detector 158 is used to disable the second comparator 150.

FIG. 10 is a block diagram of a fifth embodiment of the feedback/feed forward SCVR, which differs from the block diagram shown in FIG. 9 by the addition of a first programmable delay circuit 182, first mode control and frequency monitor circuit 184, second programmable delay circuit 186, and second mode control and frequency monitor circuit 188. The first mode control and frequency monitor circuit 184 receives the output signal 168 of the first clock generation circuit 144, and provides an output signal 190 to the first switch cell circuit 146 and an output signal 192 to the first programmable delay circuit 182. The first programmable delay circuit 182 also receives the output signal 166 of the first latch toggle flip-flop 142, and provides an output signal 194 to the first clock edge detector 148. Similarly, the second mode control and frequency monitor circuit 188 receives the output signal 178 of the second clock generation circuit 154, and provides an output signal 194 to the second switch cell circuit 156 and an output signal 196 to the second programmable delay circuit 186. The second programmable delay circuit 186 also receives the output signal 176 of the second latch toggle flip-flop 152, and provides an output signal 198 to the second clock edge detector 158.

Figure 11A:
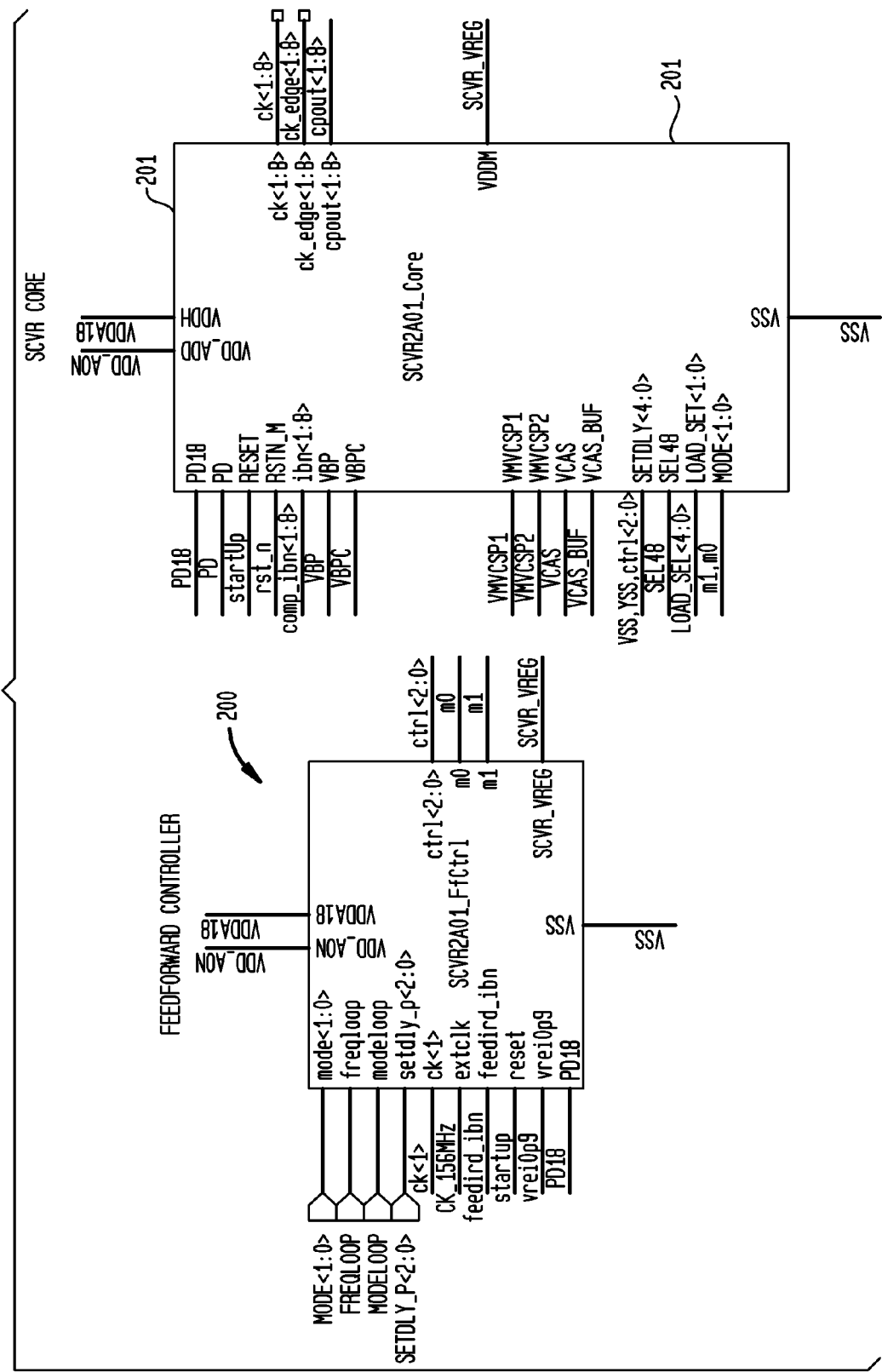
FIGS. 11A-G are schematic diagrams of portions of a sixth embodiment of the feedback/feed forward SCVR.
Figures 1, 11B:
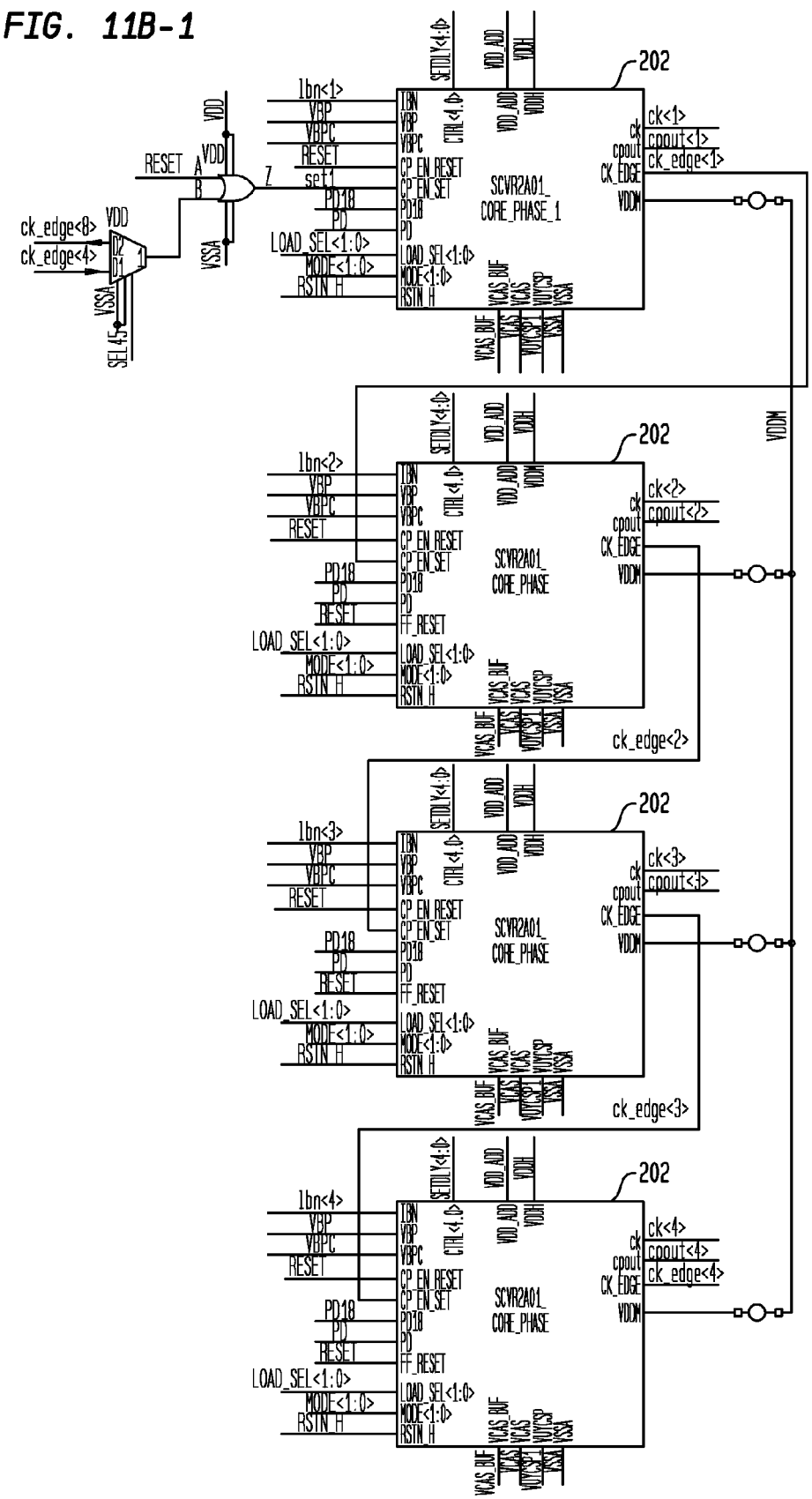
Figures 2, 11B:
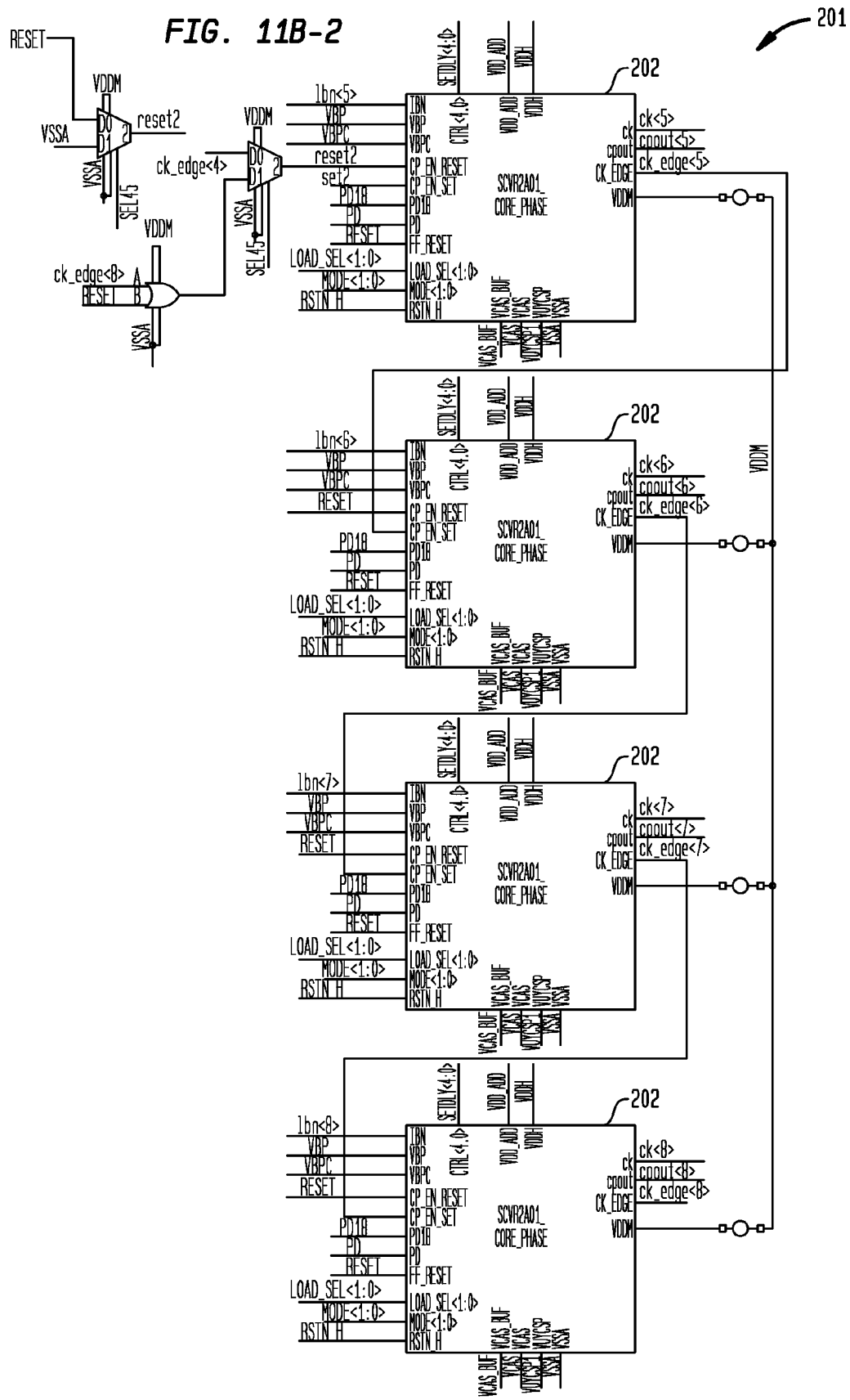
Figure 11C:
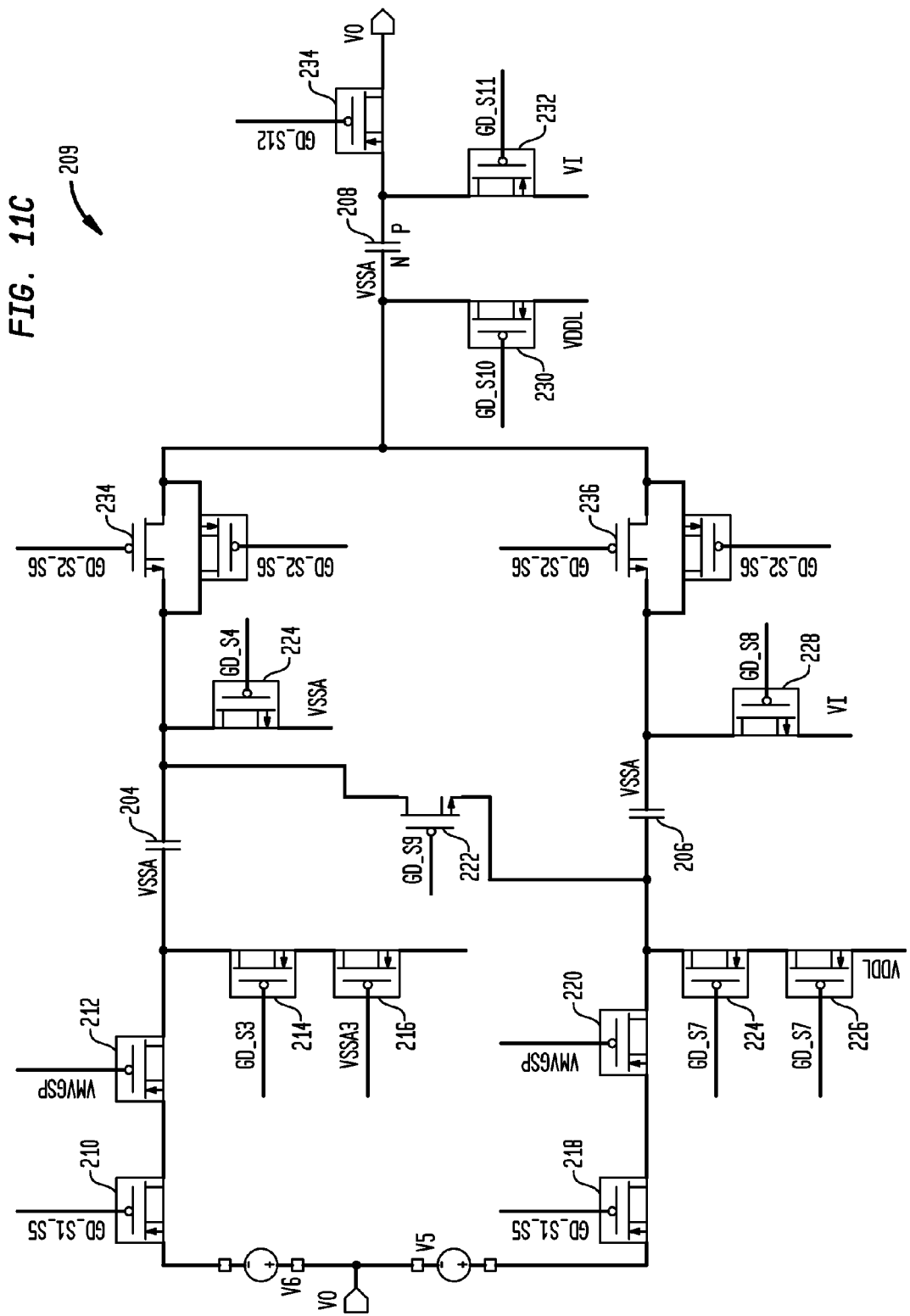
Figures 1, 11D:
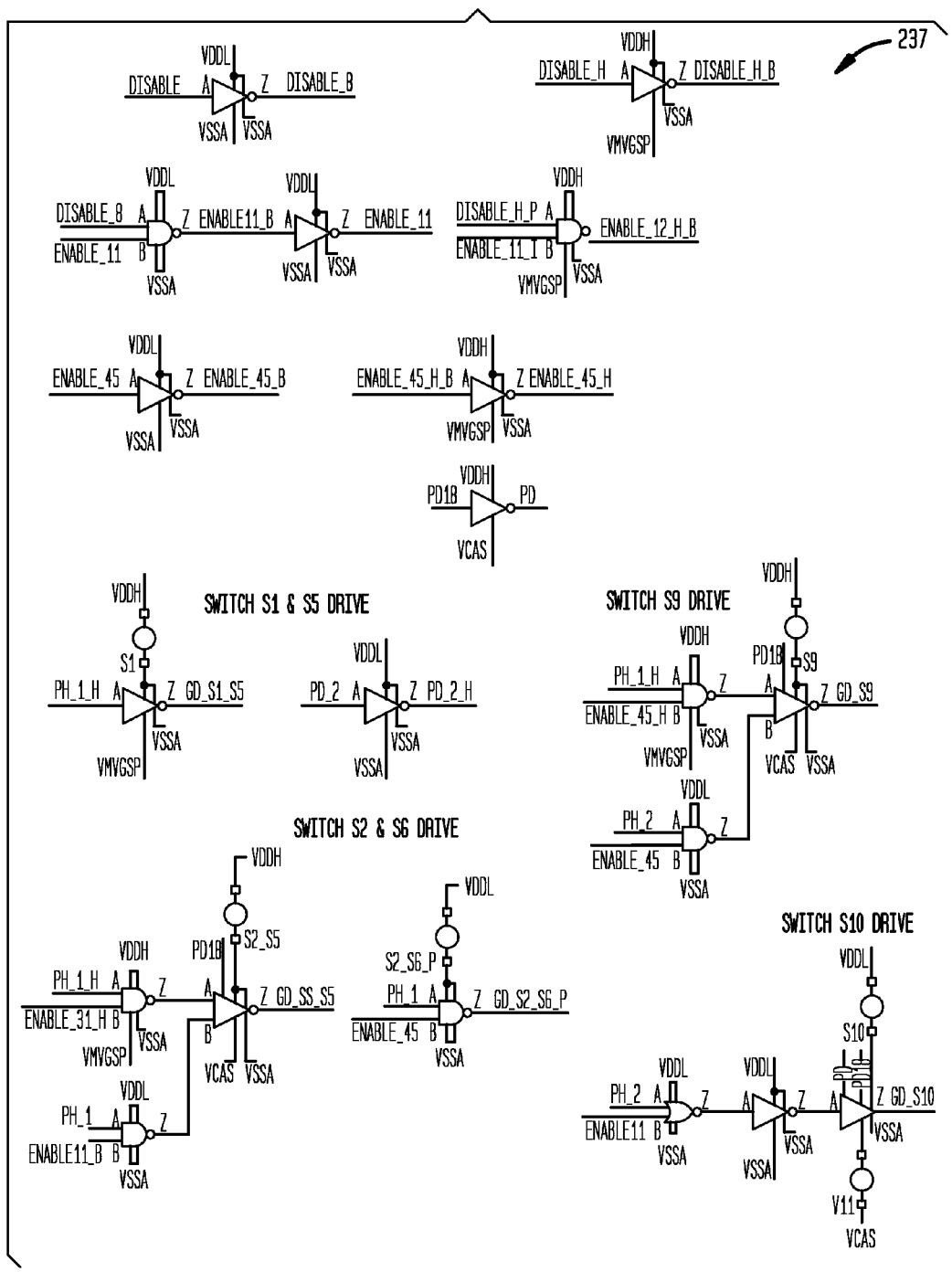
Figures 2, 11D:
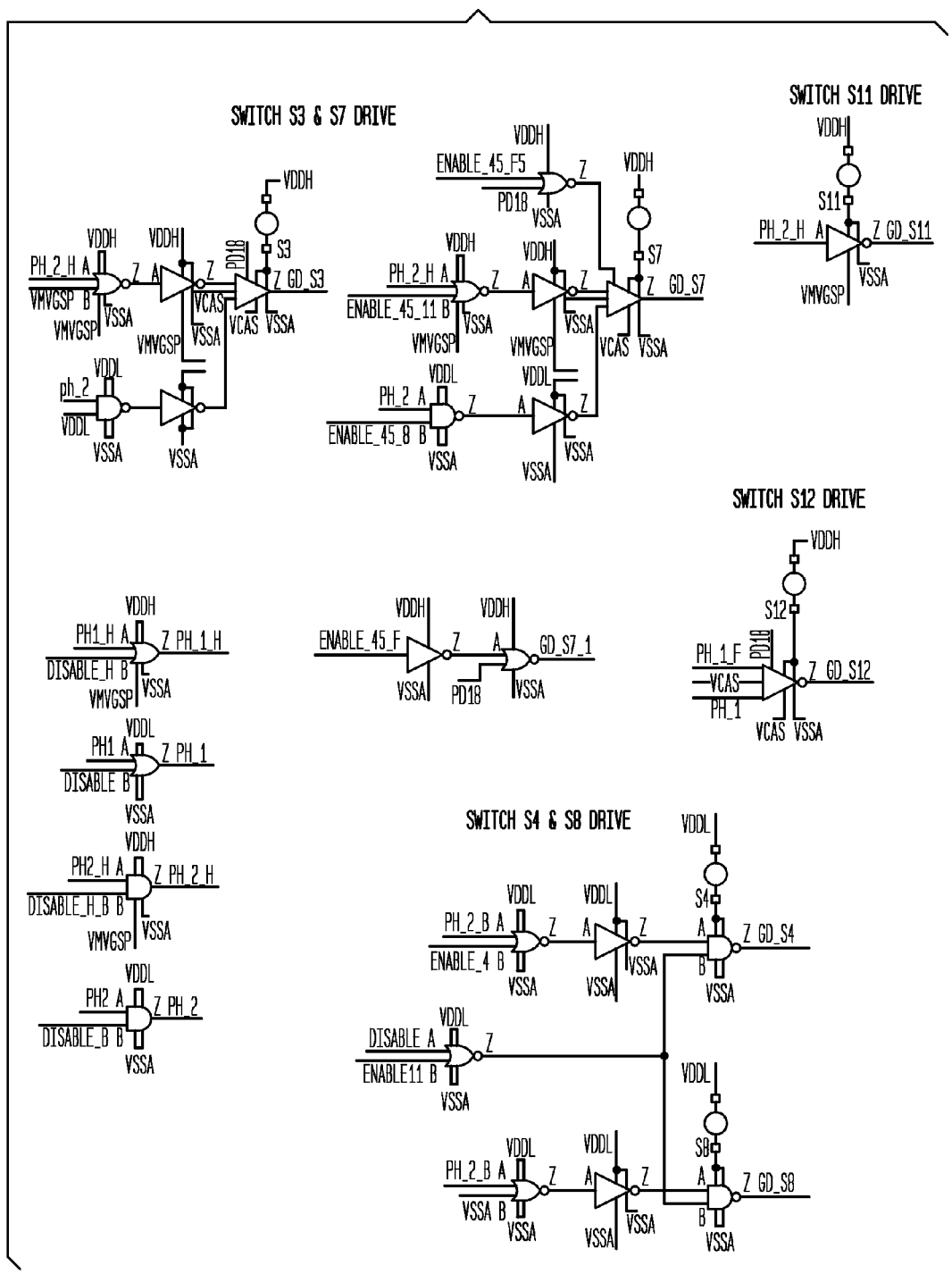

FIGS. 11A-G are schematic diagrams depicting at least portions of an exemplary feedback/feed forward SCVR circuit, according to another embodiment of the invention. It is to be appreciated that embodiments of the invention are not limited to the specific circuit arrangement shown. Specifically, FIG. 11A is a top-level block diagram showing a feed forward controller circuit 200 and an SCVR core 201. FIG. 11B shows the SCVR core 201 in greater detail as including eight (8) interconnected core slices 202, each of which includes two (2) switch cells for a total of sixteen (16) switch cells. The core slices 202 provide eight (8) interleaving phases to reduce the ripple amplitude. The embodiment in FIG. 10 shows two (2) interleaved phases. FIG. 11C shows one of the two (2) switch cells 209 included in each of the core slices 202 shown in FIG. 11B. The switch cell 209 includes three capacitors 204, 206, 208 that are programmably configured to provide at least four (4) different topology factors using metal-oxide-semiconductor field-effect transistor (MOSFET) switches 210-234 and pass-gates 234, 236. FIG. 11D shows a clock driver generator circuit 237 used to control and drive the MOSFET switches 210-234 and pass-gates 234, 236 shown in FIG. 11C.

Figure 11E:
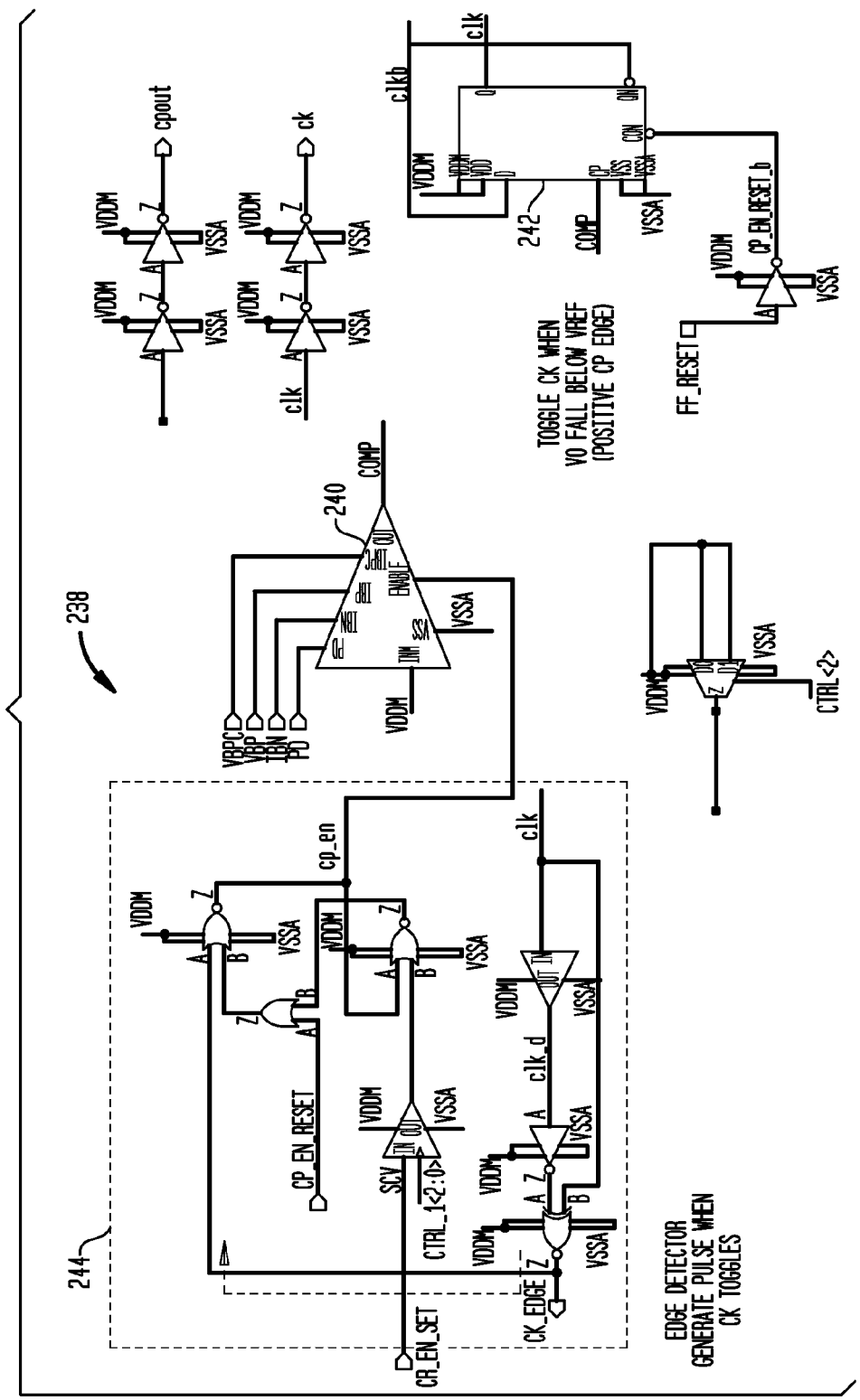
Figures 1, 11F:
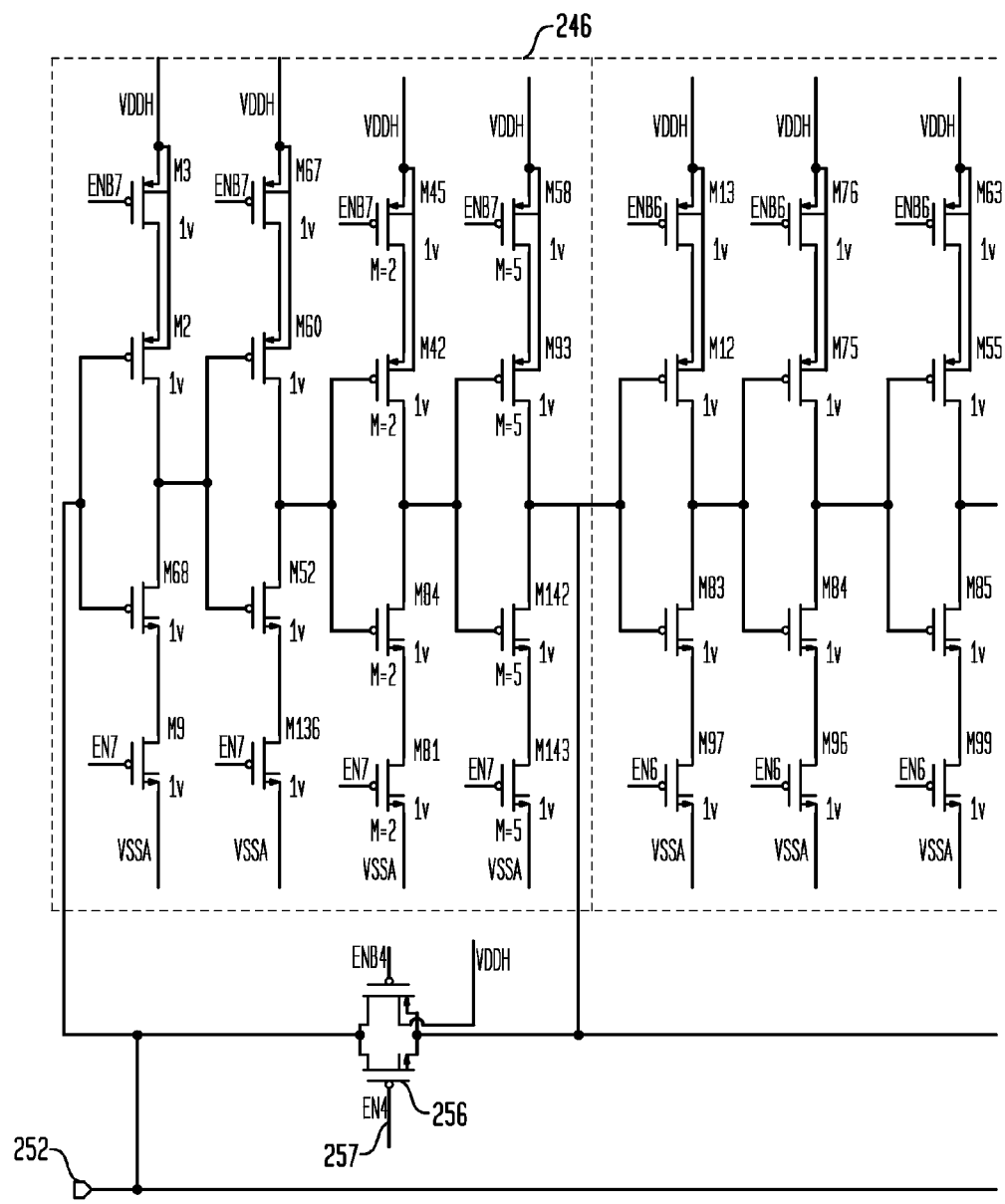
Figure 11F:
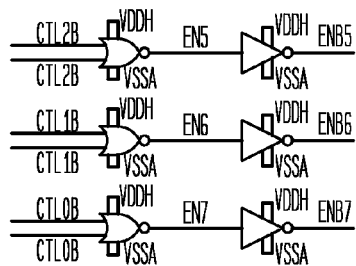
Figure 3:
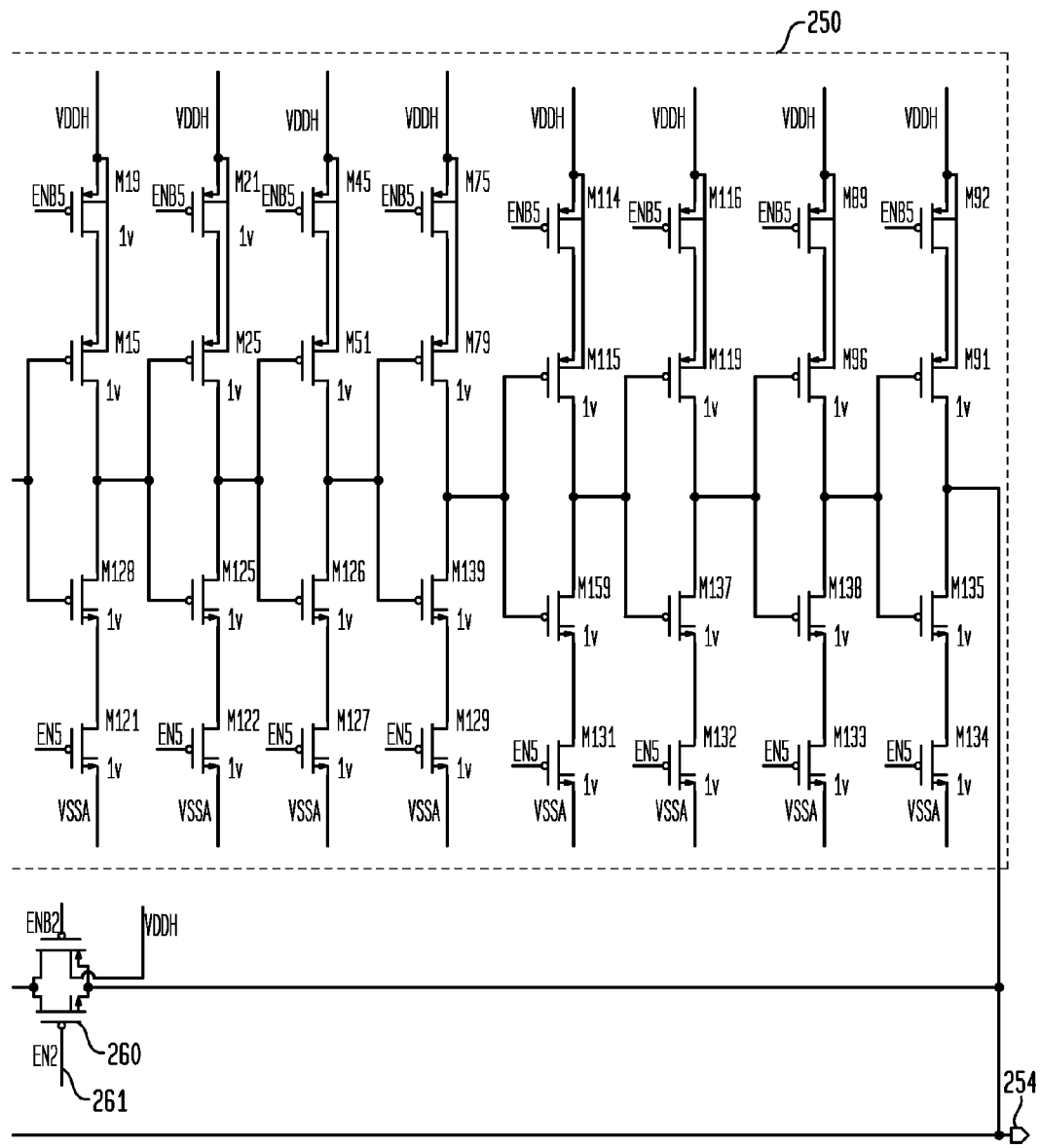
Figure 11G:
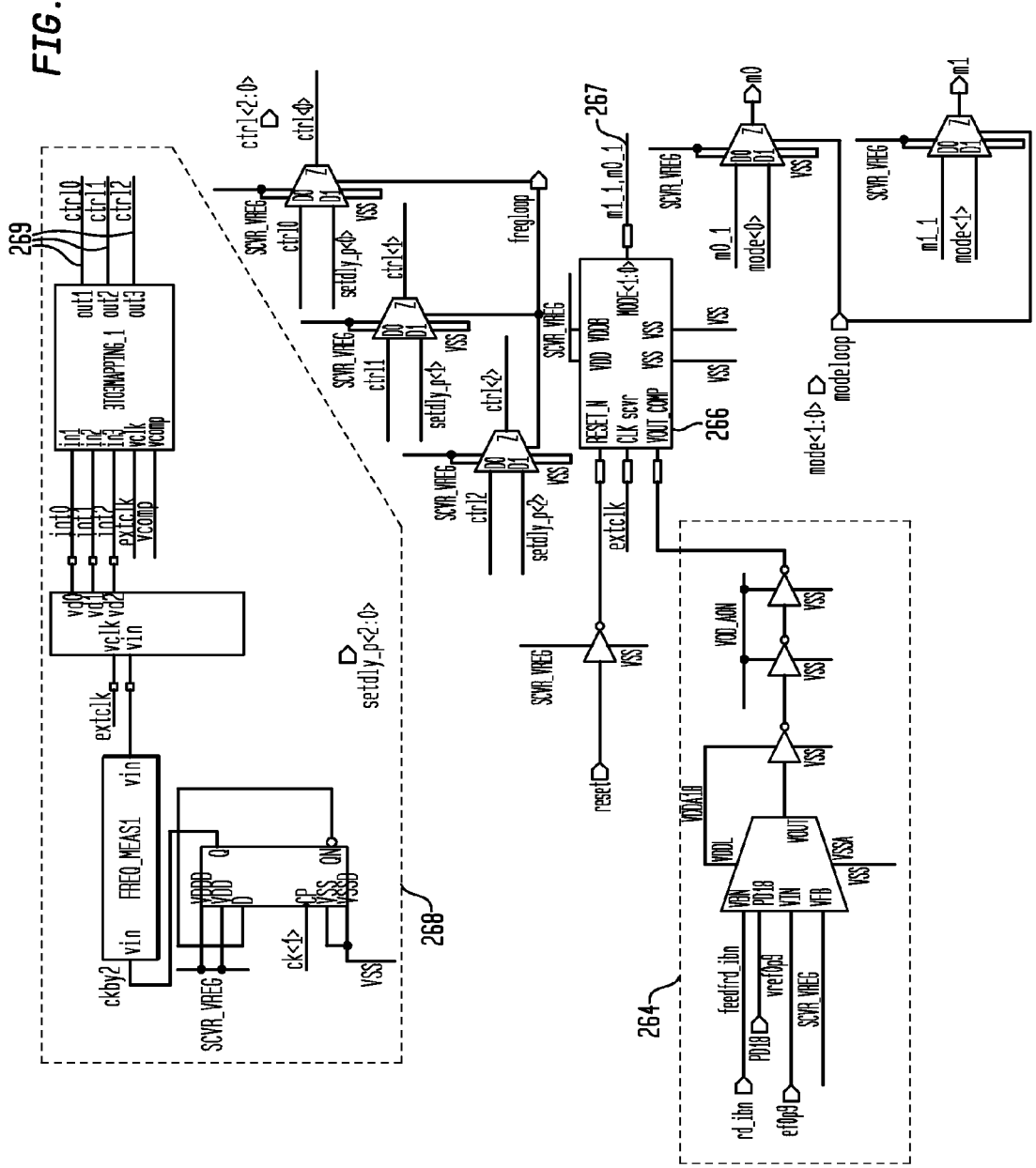

FIG. 11E shows the hysteretic loop 238, which includes a comparator 240, toggle flip flop 242, and programmable loop delay circuit 244. FIG. 11F shows the programmable loop delay circuit 244 in greater detail as including three (3) sets of MOSFETS 246-250, which are programmably coupled between an input terminal 252 and an output terminal 254 using four (4) pass gates 256, 258, 260 and 262. Three (3) bits 257, 259, 261 are used control delay in the critical path. FIG. 11G shows an output voltage monitoring circuit 264 that determines whether there is a dc shift in the output voltage, such as when the average output voltage is less than the reference voltage. Under such circumstances, the output voltage monitoring circuit 264 controls a mode control circuit 266 to adjust the mode topology factor using two (2) mode control bit signals 267. FIG. 11G also shows a frequency measurement and programmable loop delay control circuit 268, which enables ripple amplitude to be controlled using three (3) loop delay control bit signals 269 to selectively adjust the programmable loop delay. The loop delay control bit signals 269 are generated by monitoring the frequency of the generated clock, and the mode control bit signals 267 are generated by monitoring the output voltage of the SCVR. For example, in response to the SCVR output voltage being less than 200 millivolts (mV) below the reference voltage signal, the topology factor or mode of operation is modified to ensure that the clock frequency is sufficient to enable the SCVR output voltage to increase above the reference voltage even if ripple amplitude is increased and power efficiency is decreased.

The feedback/feed forward SCVR is configurable to provide a decreased output voltage in response to greater load current requirements without increasing the frequency of operation. For example, if an output voltage of 0.8 volt (V) is nominally required, but an output voltage of 0.75 V is tolerable under limited circumstances during increased load current requirements, then the feedback/feed forward SCVR will satisfy the increase in load current requirement by maintaining the frequency of operation and reducing the output voltage to a predetermined and/or satisfactory level. In this way, the feedback/feed forward SCVR is able to avoid a collapse of the SCVR ordinarily exhibited by conventional SCVRs in response to increased load requirements.

Figure 12A:
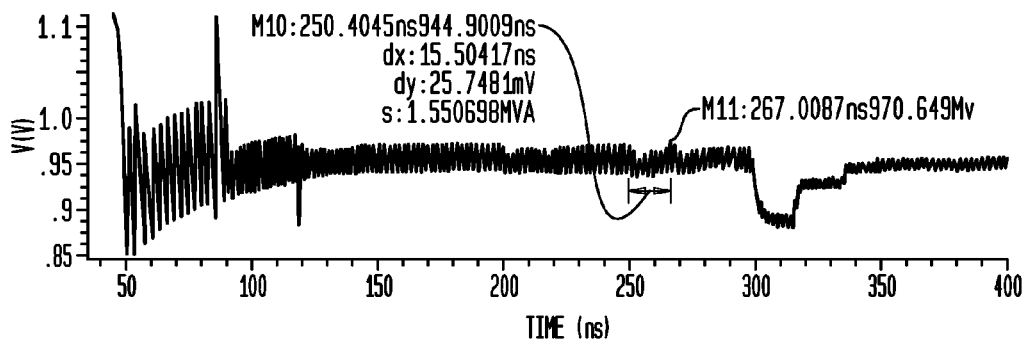
FIGS. 12A-H are plots of simulation results associated with one or more embodiments of the feedback/feed forward SCVR disclosed herein.
Figure 12B:
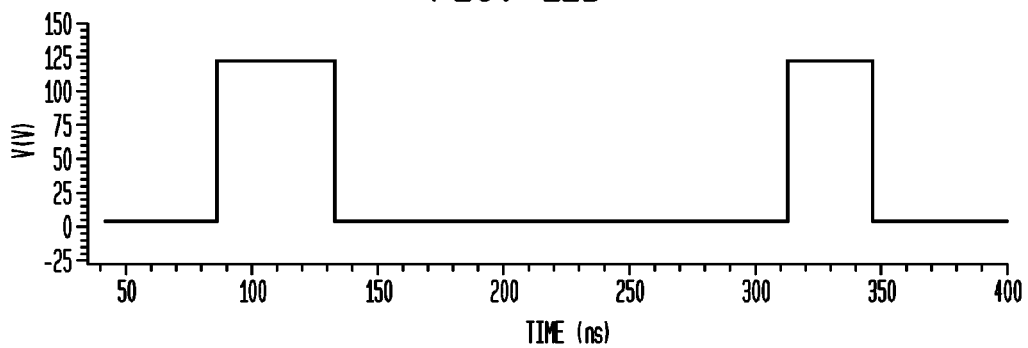
Figure 12C:
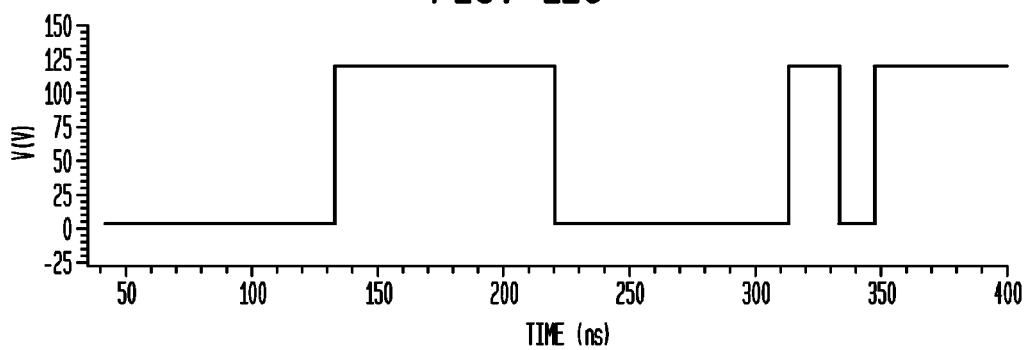
Figure 12D:
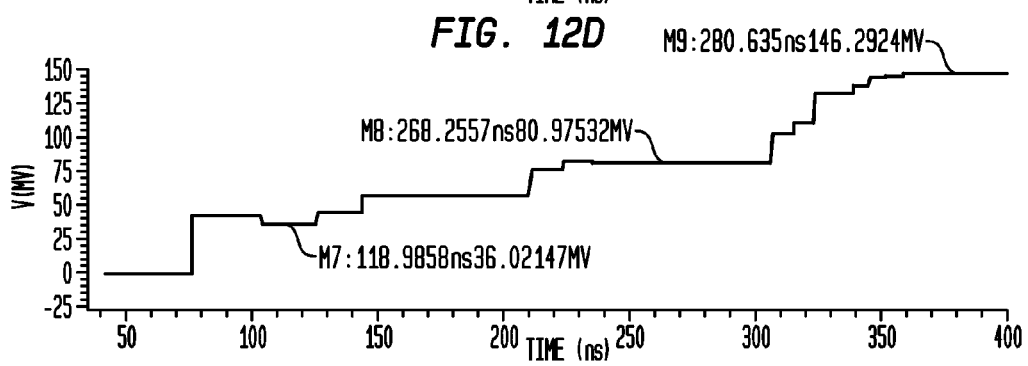
Figure 12E:
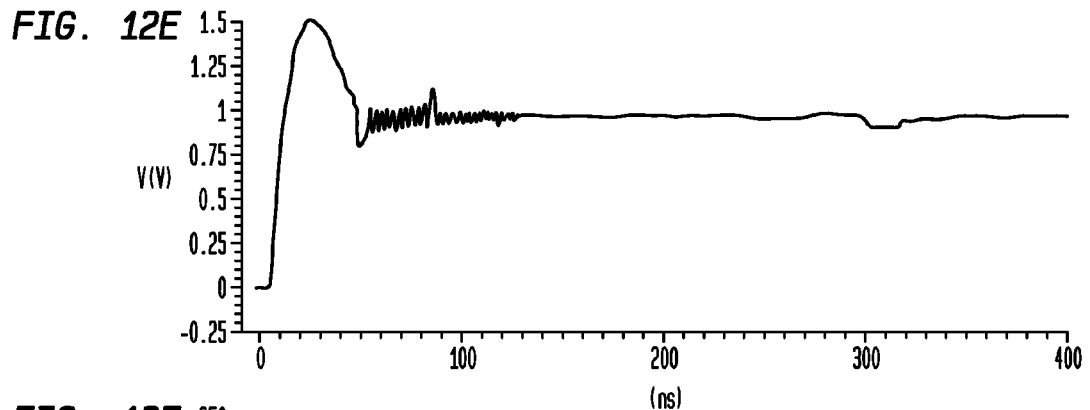
Figure 12F:
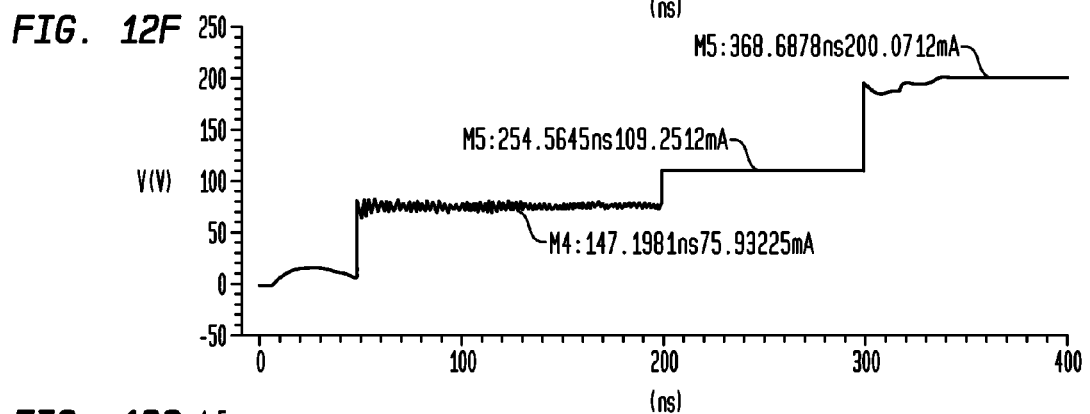
Figure 12G:
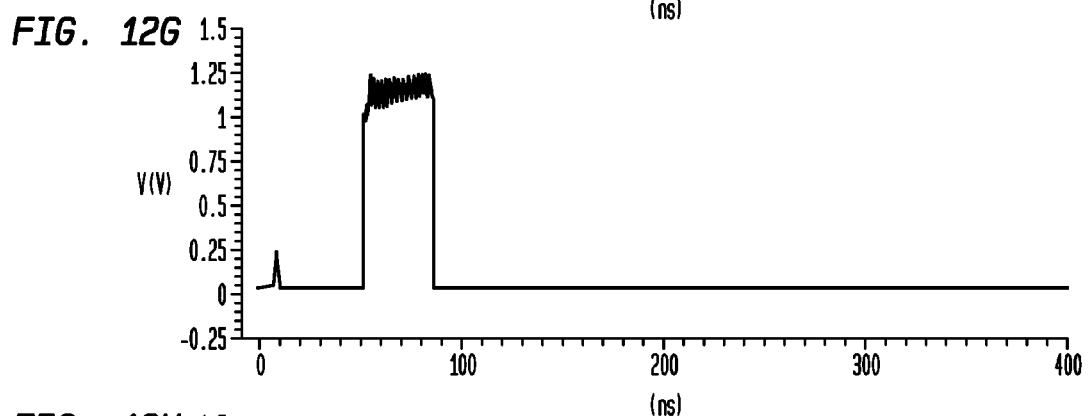
Figure 12H:
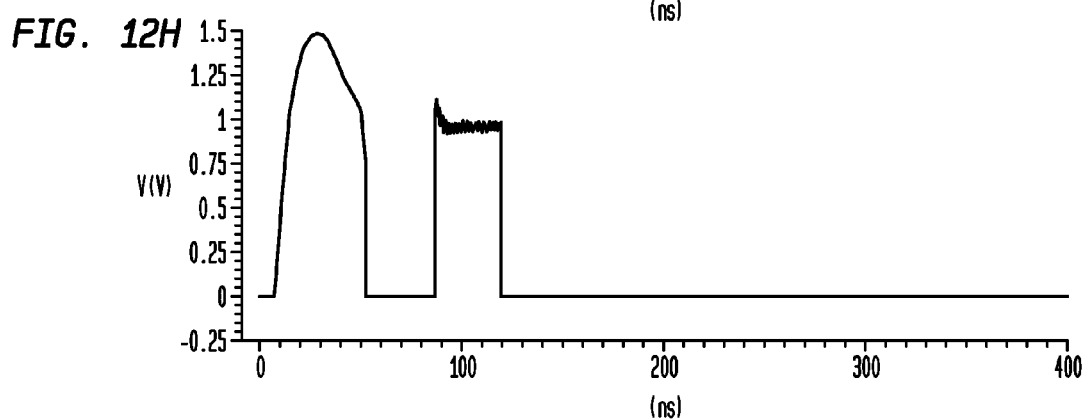

FIGS. 12A-H show graphical representations of simulations concerning the feedback/feed forward SCVR shown in FIGS. 11A-G. FIGS. 12A-D illustrate how the loop delay control bit signals 269 change with clock frequency in order to reduce ripple amplitude. Specifically, as the frequency of operation shown in FIG. 12D increases, the loop delay, which is selected by the loop delay control bit signals 269 shown in FIGS. 12B-C, is decreased. This also decreases the ripple amplitude in the SCVR output voltage as shown in FIG. 12A. FIGS. 12E-H illustrate how the mode control bit signals 267 are used to control the topology factor in response to the SCVR output voltage being less than 100 mV below the reference voltage. Specifically, as the load current shown in FIG. 12F increases, the mode control bit signals 267 shown in FIGS. 12G-H are modified in order to maintain a constant SCVR output voltage, as shown in FIG. 12A.

While a feedback/feed forward switched capacitor voltage regulator has been described in various embodiments of the invention, embodiments of the invention are not limited thereto. Any suitable form of implementing control of the SCVR in accordance with one or more embodiments disclosed herein is contemplated to be within the scope of this disclosure.

For example, alternative embodiment would include either loop delay control or mode control, but not both. As another alternative, loop delay control and/or mode control would be implemented using a microprocessor, microcontroller, application specific integrated circuit (ASIC), digital circuitry, analog circuitry, and/or a combination thereof. At least a portion of the disclosed embodiments may be implemented in an integrated circuit. In forming integrated circuits, identical die are typically fabricated in a repeated pattern on a surface of a semiconductor wafer. Each die includes a device described herein, and may include other structures and/or circuits. The individual die are cut or diced from the wafer, and then packaged as an integrated circuit. One skilled in the art would know how to dice wafers and package die to produce integrated circuits. Any of the exemplary embodiments disclosed herein, or portions thereof, may be part of an integrated circuit. Integrated circuits so manufactured are considered part of this invention.

An integrated circuit in accordance with the present invention can be employed in essentially any application and/or electronic system in which voltage regulators are utilized. Suitable systems for implementing techniques disclosed herein include, but are not limited, to personal computers, electronic instruments (e.g., automated test equipment (ATE), measurement equipment, etc.), etc. Systems incorporating such integrated circuits are considered part of this invention. Given the teachings provided herein, one of ordinary skill in the art will be able to contemplate other implementations and applications.

FIG. 13 is a block diagram of an embodiment of a machine in the form of a computing system 300, within which is a set of instructions 302 that, when executed, cause the machine to perform any one or more of the methodologies according to embodiments of the invention. In some embodiments, the machine operates as a standalone device. In some embodiments, the machine is connected (e.g., via a network 322) to other machines. In a networked implementation, the machine operates in the capacity of a server or a client user machine in a server-client user network environment. Exemplary implementations of the machine as contemplated by the invention include, but are not limited to, a server computer, client user computer, personal computer (PC), tablet PC, Personal Digital Assistant (PDA), cellular telephone, mobile device, palmtop computer, laptop computer, desktop computer, communication device, personal trusted device, web appliance, network router, switch or bridge, or any machine capable of executing a set of instructions (sequential or otherwise) that specify actions to be taken by that machine.

The computing system 300 includes a processing device(s) 304 (e.g., a central processing unit (CPU), a graphics processing unit (GPU), or both), program memory device(s) 306, and data memory device(s) 308, which communicate with each other via a bus 310. The computing system 300 further includes display device(s) 312 (e.g., liquid crystals display (LCD), flat panel, solid state display, or cathode ray tube (CRT)). The computing system 300 includes input device(s) 314 (e.g., a keyboard), cursor control device(s) 316 (e.g., a mouse), disk drive unit(s) 318, signal generation device(s) 320 (e.g., a speaker or remote control), and network interface device(s) 324, operatively coupled together, and/or with other functional blocks, via bus 310.

The disk drive unit(s) 318 includes machine-readable medium(s) 320, on which is stored one or more sets of instructions 302 (e.g., software) embodying any one or more of the methodologies or functions herein, including those methods illustrated herein. The instructions 302 also reside, completely or at least partially, within the program memory device(s) 306, the data memory device(s) 308, and/or the processing device(s) 304 during execution thereof by the computing system 300. The program memory device(s) 306 and the processing device(s) 304 also constitute machine-readable media. Dedicated hardware implementations, such as but not limited to application specific integrated circuits, programmable logic arrays, and other hardware devices can likewise be constructed to implement the methods described herein. Applications that include the apparatus and systems of various embodiments broadly comprise a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments, the methods, functions or logic described herein is implemented as one or more software programs running on a computer processor. Dedicated hardware implementations including, but not limited to, application specific integrated circuits, programmable logic arrays and other hardware devices can likewise be constructed to implement the methods described herein. Further, alternative software implementations including, but not limited to, distributed processing or component/object distributed processing, parallel processing, or virtual machine processing can also be constructed to implement the methods, functions or logic described herein.

The embodiment contemplates a machine-readable medium or computer-readable medium containing instructions 302, or that which receives and executes instructions 302 from a propagated signal so that a device connected to a network environment 322 can send or receive voice, video or data, and to communicate over the network 322 using the instructions 302. The instructions 302 are further transmitted or received over the network 322 via the network interface device(s) 324. The machine-readable medium also contains a data structure for storing data useful in providing a functional relationship between the data and a machine or computer in an illustrative embodiment of the systems and methods herein.

While the machine-readable medium 302 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform anyone or more of the methodologies of the embodiment. The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the embodiment is considered to include any one or more of a tangible machine-readable medium or a tangible distribution medium, as listed herein and including art-recognized equivalents and successor media, in which the software implementations herein are stored.

It should also be noted that software, which implements at least a portion of the methods, functions and/or logic herein, are optionally stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. A digital file attachment to e-mail or other self-contained information archive or set of archives is considered a distribution medium equivalent to a tangible storage medium. Accordingly, the disclosure is considered to include a tangible storage medium or distribution medium as listed herein and other equivalents and successor media, in which the software implementations herein are stored.

As previously stated, although the specification describes components and functions implemented in accordance with embodiments of the invention with reference to particular standards and protocols, the embodiments are not limited to such standards and protocols.

The illustrations of embodiments of the invention described herein are intended to provide a general understanding of the structure of the various embodiments, and they are not intended to serve as a complete description of all the elements and features of apparatus and systems that might make use of the structures described herein. Many other embodiments will become apparent to those of skill in the art given the teachings herein. Other embodiments are utilized and derived therefrom, such that structural and logical substitutions and changes are made without departing from the scope of this disclosure. Figures are also merely representational and are not necessarily drawn to scale. Certain proportions thereof may be exaggerated, while others diminished in order to facilitate an explanation of the embodiments of the invention. Accordingly, the specification and drawings are to be regarded in an illustrative rather than a restrictive sense.

Such embodiments of the inventive subject matter are referred to herein, individually and/or collectively, by the term "embodiment" merely for convenience and without intending to voluntarily limit the scope of this application to any single embodiment or inventive concept if more than one is in fact shown. Thus, although specific embodiments have been illustrated and described herein, it should be appreciated that any arrangement calculated to achieve the same purpose are substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single embodiment. Thus the following claims are hereby incorporated into the Detailed Description, with each claim standing on its own as a separate example embodiment.

The Abstract is provided to comply with 37 C.F.R. §1.72 (b), which requires an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single embodiment. Thus the following claims are hereby incorporated into the Detailed Description, with each claim standing on its own as separately claimed subject matter.

Although specific example embodiments have been described, it will be evident that various modifications and changes are made to these embodiments without departing from the broader scope of the inventive subject matter described herein. Accordingly, the specification and drawings are to be regarded in an illustrative rather than a restrictive sense. The accompanying drawings that form a part hereof, show by way of illustration, and without limitation, specific embodiments in which the subject matter are practiced. The embodiments illustrated are described in sufficient detail to enable those skilled in the art to practice the teachings herein. Other embodiments are utilized and derived therefrom, such that structural and logical substitutions and changes are made without departing from the scope of this disclosure. This Detailed Description, therefore, is not to be taken in a limiting sense, and the scope of various embodiments is defined only by the appended claims, along with the full range of equivalents to which such claims are entitled.

Given the teachings of the invention provided herein, one of ordinary skill in the art will be able to contemplate other implementations and applications of the techniques of the invention. Although illustrative embodiments of the invention have been described herein with reference to the accompanying drawings, it is to be understood that the invention is not limited to those precise embodiments, and that various other changes and modifications are made therein by one skilled in the art without departing from the scope of the appended claims.

Although illustrative embodiments of the invention have been described herein with reference to the accompanying drawings, it is to be understood that the invention is not limited to those precise embodiments, and that various other changes and modifications may be made therein by one skilled in the art without departing from the scope of the appended claims.

What is claimed is:

1. A method of controlling a switched capacitor voltage regulator, the method comprising:
   modifying a topology factor associated with the switched capacitor voltage regulator in response to a change in output voltage associated with the switched capacitor voltage regulator, thereby maintaining an average output voltage associated with the switched capacitor voltage regulator; and
   modifying a loop delay associated with the switched capacitor voltage regulator in response to a change in operational frequency associated with the switched capacitor voltage regulator, thereby reducing ripple amplitude associated with the switched capacitor voltage regulator.

2. The method of controlling a switched capacitor voltage regulator, as defined by claim 1, wherein modifying the topology factor further comprises modifying the topology factor in response to the output voltage associated with the switched capacitor voltage comprising a dc bias.

3. The method of controlling a switched capacitor voltage regulator, as defined by claim 1, wherein modifying the topology factor further comprises increasing the topology factor in response to the output voltage associated with the switched capacitor voltage regulator being at least one of less than a reference voltage and equal to the reference voltage.

4. The method of controlling a switched capacitor voltage regulator, as defined by claim 1, wherein modifying the topology factor further comprises decreasing the topology factor in response to the output voltage associated with the switched capacitor voltage regulator being at least one of greater than a reference voltage and equal to the reference voltage.

5. The method of controlling a switched capacitor voltage regulator, as defined by claim 1, further comprising modifying the loop delay associated with the switched capacitor voltage regulator in response to a change in load current associated with the switched capacitor voltage regulator.

6. The method of controlling a switched capacitor voltage regulator, as defined by claim 1, further comprising decreasing the loop delay in response to an increase in load current associated with the switched capacitor voltage regulator.

7. The method of controlling a switched capacitor voltage regulator, as defined by claim 1, further comprising increasing the loop delay in response to a decrease in load current associated with the switched capacitor voltage regulator.

8. A feedback/feed forward switched capacitor voltage regulator, which comprises:
   a switched capacitor voltage regulator;
   a topology factor circuit, the topology factor circuit being operatively coupled to the switched capacitor voltage regulator, the topology factor circuit modifying a topology factor associated with the switched capacitor voltage regulator in response to a change in output voltage associated with the switched capacitor voltage regulator, thereby maintaining an average output voltage associated with the switched capacitor voltage regulator; and
   a loop delay circuit, the loop delay circuit being operatively coupled to the switched capacitor voltage regulator, the loop delay circuit modifying a loop delay associated with the switched capacitor voltage regulator in response to a change in operational frequency associated with the switched capacitor voltage regulator, thereby reducing ripple amplitude associated with the switched capacitor voltage regulator.

9. The feedback/feed forward switched capacitor voltage regulator, as defined by claim 8, wherein modifying the topology factor further comprises modifying the topology factor in response to the output voltage associated with the switched capacitor voltage comprising a dc bias.

10. The feedback/feed forward switched capacitor voltage regulator, as defined by claim 8, wherein modifying the topology factor further comprises increasing the topology factor in response to the output voltage associated with the switched capacitor voltage regulator being at least one of less than a reference voltage and equal to the reference voltage.

11. The feedback/feed forward switched capacitor voltage regulator, as defined by claim 8, wherein modifying the topology factor further comprises decreasing the topology factor in response to the output voltage associated with the switched capacitor voltage regulator being at least one of greater than a reference voltage and equal to the reference voltage.

12. The feedback/feed forward switched capacitor voltage regulator, as defined by claim 8, further comprising modifying the loop delay associated with the switched capacitor voltage regulator in response to a change in load current associated with the switched capacitor voltage regulator.

13. The feedback/feed forward switched capacitor voltage regulator, as defined by claim 8, further comprising decreasing the loop delay in response to an increase in load current associated with the switched capacitor voltage regulator.

14. The feedback/feed forward switched capacitor voltage regulator, as defined by claim 8, further comprising increasing the loop delay in response to a decrease in load current associated with the switched capacitor voltage regulator.

15. A controller for a switched capacitor voltage regulator, the controller comprising:
   a topology factor circuit, the topology factor circuit being configured to be coupled to a switched capacitor voltage regulator, the topology factor circuit modifying a topology factor associated with the switched capacitor voltage regulator in response to a change in output voltage associated with the switched capacitor voltage regulator, thereby maintaining an average output voltage associated with the switched capacitor voltage regulator; and
   a loop delay circuit, the loop delay circuit being configured to be coupled to the switched capacitor voltage regulator, the loop delay circuit modifying a loop delay associated with the switched capacitor voltage regulator in response to a change in operational frequency associated with the switched capacitor voltage regulator, thereby reducing ripple amplitude associated with the switched capacitor voltage regulator.

16. The controller for a switched capacitor voltage regulator, as defined by claim 15, wherein modifying the topology factor further comprises increasing the topology factor in response to the output voltage associated with the switched capacitor voltage regulator being at least one of less than a reference voltage and equal to the reference voltage.

17. The controller for a switched capacitor voltage regulator, as defined by claim 15, wherein modifying the topology factor further comprises decreasing the topology factor in response to the output voltage associated with the switched capacitor voltage regulator being at least one of greater than a reference voltage and equal to the reference voltage.

18. The controller for a switched capacitor voltage regulator, as defined by claim 15, further comprising modifying the loop delay associated with the switched capacitor voltage regulator in response to a change in load current associated with the switched capacitor voltage regulator.

19. A computer-readable medium to store instructions that, when executed by a processing device, cause the processing device to perform operations comprising:
- modifying a topology factor associated with a switched capacitor voltage regulator in response to a change in output voltage associated with the switched capacitor voltage regulator, thereby maintaining an average output voltage associated with the switched capacitor voltage regulator; and
- modifying a loop delay associated with the switched capacitor voltage regulator in response to a change in operational frequency associated with the switched capacitor voltage regulator, thereby reducing ripple amplitude associated with the switched capacitor voltage regulator.

20. A voltage regulation system comprising:
a processing device; and
a memory to store instructions that, when executed by the processing device, cause the processing device to perform operations comprising:
- modifying a topology factor associated with a switched capacitor voltage regulator in response to a change in output voltage associated with the switched capacitor voltage regulator, thereby maintaining an average output voltage associated with the switched capacitor voltage regulator; and
- modifying a loop delay associated with the switched capacitor voltage regulator in response to a change in operational frequency associated with the switched capacitor voltage regulator, thereby reducing ripple amplitude associated with the switched capacitor voltage regulator.

* * * * *